United States Patent
Sakoh et al.

(10) Patent No.: US 6,704,434 B1
(45) Date of Patent: Mar. 9, 2004

(54) VEHICLE DRIVING INFORMATION STORAGE APPARATUS AND VEHICLE DRIVING INFORMATION STORAGE METHOD

(75) Inventors: Shinsaku Sakoh, Shizuoka (JP); Takeshi Matsumoto, Shizuoka (JP)

(73) Assignee: Suzuki Motor Corporation, Shizuoka (JP)

(*) Notice: Subject to any disclaimer, the term of this patent is extended or adjusted under 35 U.S.C. 154(b) by 656 days.

(21) Appl. No.: 09/631,948

(22) Filed: Aug. 3, 2000

(30) Foreign Application Priority Data

Jan. 27, 1999 (JP) .............................. 11-018146
Aug. 4, 1999 (JP) .............................. 11-221176

(51) Int. Cl.⁷ .............................. G06K 9/00; H04N 7/00
(52) U.S. Cl. ....................... 382/104; 348/113; 340/933; 382/243
(58) Field of Search .............................. 382/104, 243, 382/239; 348/113–120; 340/933–943, 988–996

(56) References Cited

U.S. PATENT DOCUMENTS

| 5,848,185 | A | | 12/1998 | Koga et al. |
| RE36,207 | E | * | 5/1999 | Zimmermann et al. ...... 348/207 |
| 6,141,025 | A | * | 10/2000 | Oka et al. .................... 345/531 |
| 6,292,589 | B1 | * | 9/2001 | Chow et al. ................. 382/239 |
| 6,442,465 | B2 | * | 8/2002 | Breed et al. ................... 701/45 |
| 6,533,316 | B2 | * | 3/2003 | Breed et al. ................. 280/735 |

FOREIGN PATENT DOCUMENTS

| DE | 4219133 | 12/1993 |
| DE | 10031590 | 1/2002 |
| GB | 4221280 | 3/1995 |
| JP | 9-202180 | 8/1997 |

OTHER PUBLICATIONS

English Language Abstract of JP 9-202180.

* cited by examiner

Primary Examiner—Jayanti K. Patel
Assistant Examiner—Aaron Carter
(74) Attorney, Agent, or Firm—Greenblum & Bernstein, P.L.C.

(57) ABSTRACT

The present invention provides a vehicle driving information storage apparatus capable of preserving condition changes of inside and outside of a vehicle and a driver as synchronized images. Inside a vehicle 1, a fisheye lens 5 is arrange at a position capable of simultaneously filming a driver's state and a state inside and outside the vehicle and filming is performed at a predetermined cycle and a predetermined number jmax of the latest images are always stored in the image storage unit M1. Upon detection of a driving condition sudden change such as a sudden brake and a collision, image update is performed the operations times of jmax–x1 (0<x1<jmax) and the image update is stopped so that x1 images before sudden change and jmax–x1 images after the sudden change are preserved in the image storage unit M1. By checking the images preserved in the image storage unit M1, it is possible to analyze the condition change of the driver and inside and outside of the vehicle before and after the sudden change. Since the conditions required for analysis have been filmed by a single fisheye lens 5, it is possible to store in complete synchronization the condition change of the driver with the condition change inside and outside the vehicle.

13 Claims, 23 Drawing Sheets

IMAGE OF AN ORIGINAL DATA

IMAGE AFTER CORRECTION

IMAGE AFTER CORRECTION

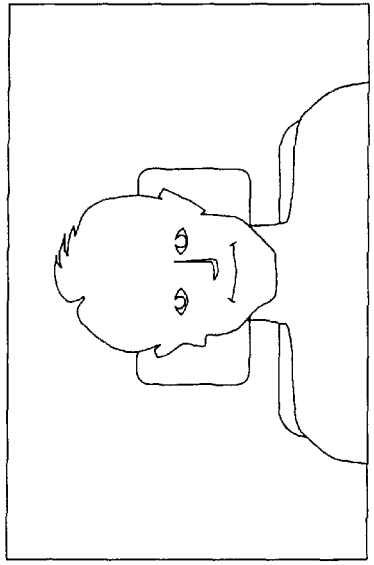
FIG. 7(b) IMAGE AFTER CORRECTION
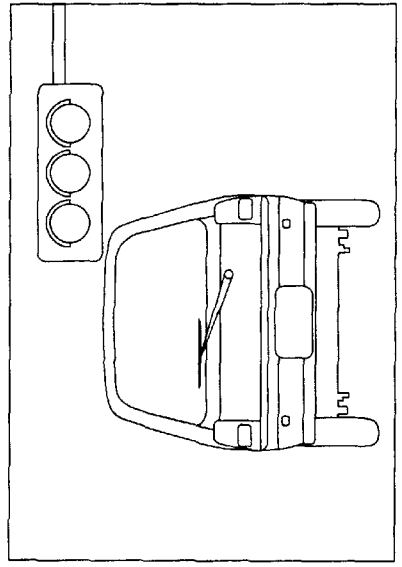
FIG. 7(c) IMAGE AFTER CORRECTION
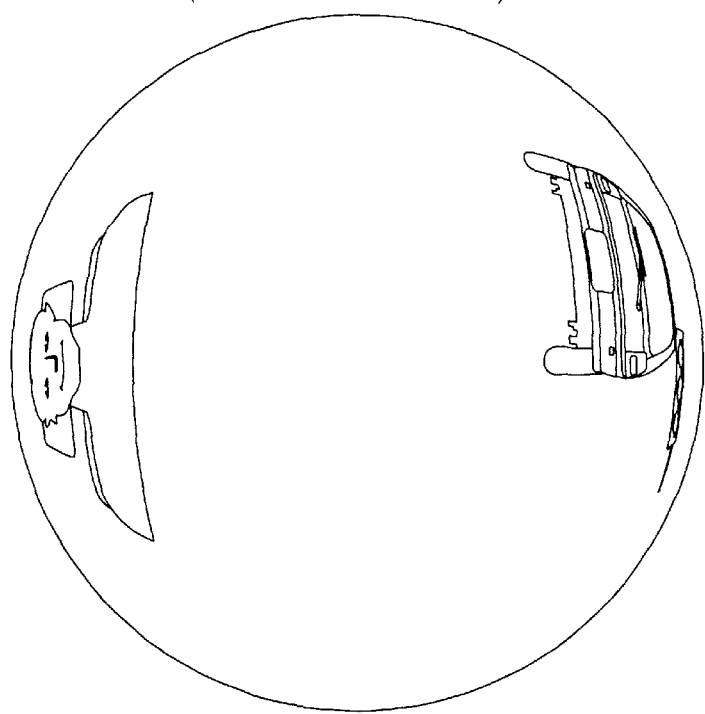
FIG. 7(a)
IMAGE OF AN ORIGINAL DATA

FIG.15(a)

| REGION | START POSITION | END POSITION | COMPRESSION RATIO |
|---|---|---|---|
| A1 | $(Xas1, Yas1)$ | $(Xae1, Yae1)$ | |
| A2 | $(Xas2, Yas2)$ | $(Xae2, Yae2)$ | |
| A3 | $(Xas3, Yas3)$ | $(Xae3, Yae3)$ | |
| . | . | . | |
| . | . | . | A (%) |
| . | . | . | |
| Ai | $(Xasi, Yasi)$ | $(Xaei, Yaei)$ | |
| . | . | . | |
| . | . | . | |
| . | . | . | |
| Am | $(Xasm, Yasm)$ | $(Xaem, Yaem)$ | |

FIG.15(b)

| REGION | START POSITION | END POSITION | COMPRESSION RATIO |
|---|---|---|---|
| B1 | $(Xbs1, Ybs1)$ | $(Xbe1, Ybe1)$ | |
| B2 | $(Xbs2, Ybs2)$ | $(Xbe2, Ybe2)$ | |
| B3 | $(Xbs3, Ybs3)$ | $(Xbe3, Ybe3)$ | |
| . | . | . | |
| . | . | . | B (%) |
| . | . | . | |
| Bj | $(Xbsj, Ybsj)$ | $(Xbej, Ybej)$ | |
| . | . | . | |
| . | . | . | |
| . | . | . | |
| Bn | $(Xbsn, Ybsn)$ | $(Xben, Yben)$ | |

VEHICLE DRIVING INFORMATION STORAGE APPARATUS AND VEHICLE DRIVING INFORMATION STORAGE METHOD

BACKGROUND OF THE INVENTION

1. Field of the Invention

The present invention relates to a vehicle driving information storage apparatus and a vehicle driving information storage method and in particular, to a data compression associated with an image storage and image processing as well as image compression ratio increase and image improvement in reproduction process.

2. Description of the Related Art

A vehicle driving information storage apparatus used for analysis of a traffic accident, a vehicle collision experiment, safety education, and the like should have at least a function for storing a state of a driver (or dummy) and a state in and out of the vehicle as images.

As shown in FIG. 8, a conventional vehicle driving information storage apparatus normally includes a first television camera 101 for filming a state out of the vehicle in the running direction of a vehicle 100 and a second television camera 102 for filming a state of the driver and a state inside the vehicle, so that images filmed by the television cameras 101 and 102 are respectively stored in video recorders 103 and 104 which function independently from each other.

Moreover, the image compression may be a reversible data compression in which an initial image can be completely reproduced after the image compression and a non-reversible data compression in which an initial image cannot be reproduced completely. From viewpoint of the data compression, the latter is more beneficial.

The data capacity can greatly be saved by sacrificing the color image gradation or using a gray scale image instead of a color image. However, the data capacity reduction in this way may not be appropriate depending on the object to be filmed. For example, when storing an image filmed by a security-associated monitor apparatus, in order to identify a person filmed, it is necessary to know the color of the clothes and the like. Moreover, in the case of a drive recorder or the like mounted on a vehicle and used for a driver education and an accident verification, it is necessary to detect from the filmed image at least a color of the traffic signal and the like.

In the aforementioned conditions, it is preferable to perform a full-color image filming which is continued for a comparatively long period of time especially in the case of monitor apparatus and the drive recorder. According, the amount of the stored image data becomes inevitably very large.

However, the first and the second television cameras 101 and 102 and the video recorders 103 and 104 should have a considerably high speed and accordingly, these apparatuses become elaborate and cost much. Moreover, each of the video recorders 104 and 104 operate independently from each other. When these video recorders are used for analysis of a traffic accident or a vehicle collision experiment, there is no guarantee of synchronization between these vide recorders even if they are rewound immediately after recovered. When they are not synchronized, it is difficult to correct the synchronization lag.

Furthermore, the first and the second television camera 101 and 102 and the video recorders 103 and 104 should always be set inside a vehicle when they are to be used for analysis of traffic accident or the like. Thus, a plurality of cameras and video recorders occupy a considerable space in the vehicle, disturbing the persons in the vehicle. Moreover, increase in weight may deteriorate the acceleration and brake functions of the vehicle.

Moreover, as the image data compression method for full color, the JPEG compression method including a sequential coding as a mode is widely used. However, when an image is stored with a high compression ratio, the image quality is deteriorated and it is impossible to obtain a sufficient resolution or sharpness. Currently, the compression ratio is lowered to obtain a high quality or the compression ratio is increased to save the data capacity. It is impossible to simultaneously obtain a high compression ratio and a high image quality.

Moreover, in the case of a monitor apparatus and a drive recorder, a fisheye lens is often used so as to film a wide range of area. Here the use of the fisheye lens is meaningless unless an image is formed on a film surface or a CCD light detecting surface without eclipse in the entire angle of the lens. On the other hand, the film surface and the CCD light detecting surface normally have a rectangular shape. In order to put a circular image formation into the rectangular shape, the diameter of the image should not exceed the length of the shorter side of the light detecting surface. That is, an unnecessary space is present at both sides of the light detecting surface and the image filmed is positioned at the center potion.

In the case of the data compression method of the sequential coding type, the image is scanned from left to right starting in the first line up to the last line from top- to the bottom so as to obtain an image data in a rectangular frame format. Accordingly, the shape of image that can be scanned is limited to a rectangular shape. Consequently, in order to scan a circular image, it is necessary to take at least an image of a rectangular shape circumscribed about the circle. Actually, the four corners of the rectangular shape are unnecessary space having no filmed image and input of an unnecessary data increases the image data capacity

SUMMARY OF THE INVENTION

It is therefore an object of the present invention to provide a vehicle driving information storage apparatus capable of storing a state inside and outside the vehicle and a state of the driver in synchronization, without disturbing the space inside the vehicle or causing a considerable weight increase, and that at a reasonable cost.

Another object of the present invention is to provide a vehicle driving information storage method having a high compression effect and capable of image compression and reproduction without deteriorating an image of a necessary portion.

The vehicle driving information storage apparatus according to the present invention is for storing image of a driver's state and vehicle state and comprises: a wide angle lens arranged at a position capable of simultaneously filming a driver's state and a state inside and outside a vehicle; a signal output unit for outputting as a digital signal each one shot of an image filmed by the wide angle lens; an image storage unit having a capacity to store a plurality of shots of digital signals output from the signal output unit and updating the digital signals output from the signal output unit at a predetermined cycle; a condition change detection unit for detecting a sudden change of a driving condition of the vehicle; and a necessary image data preserving unit inhibiting update of images after detection of a driving condition sudden change by the condition detection unit.

Among the images filmed by the wide angle lens at a predetermined cycle, the latest shots of image, for example, jmax shots of image are stored in the latest image storage unit. More specifically, the latest image storage unit has a capacity for storing jmax shots of image filmed by the wide angle lens. After the first jmax shots of image are stored, a new image is overwritten while erasing the oldest image, so that the latest jmax shots of image are always stored.

Upon detection of a driving condition sudden change by the condition change detection unit, a new image overwrite is performed a predetermined number of times which is smaller than jamx, for example, jmax−x1 (0<x1<jmax) and then the necessary data preserving unit inhibits a new image overwrite in the latest image storage unit.

Accordingly, the latest image storage unit preserves images filmed x1 times at a predetermined cycle before the moment of the driving condition sudden change and images filmed jmax−x1 times at a predetermined cycle after the moment of the driving condition sudden change.

Since the wide angle lens is used for simultaneously filming the driver's state and the state inside and outside the vehicle, there is no need of setting a plurality of cameras and video recorders, which enables to reduce the apparatus size and the cost. The reduced size of the apparatus need not occupy a large space inside the vehicle, leaving a large free space. Moreover, since a single wide angle lens is used for simultaneously filming the driver's state and the state inside and outside the vehicle, unlike the case using a plurality of cameras, there is no danger of synchronization lag between the images of inside and outside the vehicle.

Moreover, the apparatus comprises a first and a second latest image storage unit having different image update cycles arranged in parallel to each other.

The latest image storage unit having a shorter image update cycle, e.g., the first latest image storage unit contains images for accurate analysis of the driver's state and condition changes inside and outside the vehicle immediately before and after a moment of occurrence of a driving condition sudden change. Moreover, the latest image storage unit having a longer image update cycle, e.g., the second latest image storage unit contains images for rough grasp of the driver's state and condition changes inside and outside the vehicle for a comparatively long period of time before and after the occurrence of the driving condition sudden change.

In the latest image storage unit for storing images for a comparatively long period of time before and after an occurrence of a driving condition sudden change, the filming cycle is set long for image storage. Accordingly, even if an image is recorded over a long period of time, the storage capacity required for image storage is comparatively small.

Moreover, in the latest image storage unit for accurately storing the condition change before and after an occurrence of a driving condition sudden change, the filming cycle is set short for image storage. Accordingly, it is possible to accurately analyze a change caused instantaneously. In this latest image storage unit, an image is written at a short cycle but this unit is activated for only a limited period of time before and after the occurrence of the driving condition sudden change. Accordingly, there will not arise a problem of increasing the storage capacity.

Furthermore, a convex mirror is arranged within a field angle of the wide angle lens so that an image in a dead space of the wide angle lens is filmed via the convex mirror. Thus, it is possible to film various portions without increasing the number of filming lenses.

Moreover, the apparatus further comprises a condition detection unit for detecting a condition of a driver or a vehicle so as to be output as a digital data, which is stored in synchronization with the image update cycle. Thus, it is possible to store various data detected by the condition detection unit, together with an image without a synchronization lag.

When the condition detection unit is a acceleration sensor, it is possible to know a condition change before and after an acceleration sudden change due to a sudden brake or collision. This is helpful for analysis of a traffic accident, safety education, vehicle collision experiments, and the like.

Furthermore, when each of the latest image storage unit, the condition change detection unit, and the necessary image data preserving unit is provided with a power backup unit arranged independently of functional components of the vehicle, even if the vehicle is severely damaged by a collision, it is possible to obtain, store, and maintain an image data after the occurrence of the condition sudden change.

According to another aspect of the present invention, the image processing method for compressing an image using an irreversible compression algorithm in which an image quality is deteriorated as a compression ratio increases comprises steps of: dividing the image into a plurality of types of regions according to the image information importance in the image; setting different compression ratios for the types of regions in such a way that a region of a lower importance has a higher compression ratio than a region of a higher importance; generating a compressed data for each of the regions and storing the compressed data in a data storage medium together with a position information of the respective regions; and when reproducing the image, separately decompressing the compressed data of the respective regions stored in the data storage medium and relocating the data according to the position information of the corresponding region.

With this configuration, a low compression ratio is set for the region having a higher importance of image information and it is possible to prevent deterioration of the quality of the image of a higher importance. Moreover, for the region of a lower importance, a high compression ratio can be set independently of the compression ratio of the region of a higher importance. Accordingly, it is possible to significantly reduce the storage capacity of the entire compressed data. Images of the respective regions are compressed and reproduced independently from one another. The compressed data of the respective regions are stored in the data storage medium together with their position information and accordingly, at image reproduction, it is possible to correctly relocate a decompressed image so as to reproduce an original image.

It should be noted that a type of region may be dispersed at a plurality of region portions.

Moreover, the aforementioned object may be obtained by the method comprising steps of: dividing the image into a necessary region and an unnecessary region, so that the unnecessary region of the image is discarded and only the necessary region of the region is taken out to generate a compressed data which is stored together with a position information of the region in a data storage medium, and when reproducing the image, decompressing the compressed data of the necessary region stored in the data storage medium and relocating the decompressed data according to the position information.

With this configuration, the image data of the unnecessary portion will not be stored as a compressed data and it is possible to significantly save the compressed data capacity. Accordingly, even when an image compression of high image quality with a low compression ratio is performed, it is possible to reduce the capacity of the compressed data.

Furthermore, by applying simultaneously applying the aforementioned two configurations, it is possible to further increase the image compression efficiency. That is, the image processing method comprises steps of: dividing the image into a necessary region and an unnecessary region according to importance of the image information in the image and discarding the image of the unnecessary region; dividing the necessary region into a plurality of types of regions according to the importance of the image information in the necessary region; setting different compression ratios for the respective types of the regions in such a manner that a region of a lower importance has a high compression ratio than a region of a higher importance and generating a compressed data for each of the regions of the necessary region so as to be stored together with a position information of the respective regions in a data storage medium; and when reproducing the image, separately decompressing the compressed data of the respective regions of the necessary region and relocating the decompressed data according to the respective position information of the corresponding regions.

As has been described above, in the compression method of the sequential coding, the image which can be scanned is limited to a rectangular shape. When the aforementioned regions have irregular shapes, this compression method cannot be applied.

However, by dividing each of the regions into small rectangular areas, it is possible to apply the sequential coding to the respective regions for generating a compressed data. In this case, by storing the compressed data together with the position information of the small rectangular areas, it is possible to reproduce an original image.

A vehicle driving information storage apparatus according to the present invention comprises:

a compression condition setting block having: a region setting unit for setting a plurality of types of image storage regions for a memory taking in an image; and a compression ratio setting unit for setting a compression ratio of each of the image storage regions, an image compression block having: a compression condition storage unit for storing the image storage regions set in the compression condition setting block, their position information, and compression ratios; a compressed data generation unit for generating a compressed data for each of the image storage regions according to the image storage regions and compression ratios stored in the compression condition storage unit; and a data storage medium for storing the compressed data generated by the compression data generating unit; and an image reconstruction block having: a compressed data decompressing unit for separately decompressing the compressed data stored in the data storage medium according to the compression ratios stored in the compression condition storage unit for each of the image storage regions; and image reproduction an for relocating the decompressed data on an image reproduction memory according to the position information of the respective image storage regions stored in the compression condition storage unit and reproducing the image.

The region setting unit of the compression condition setting block is used for setting a plurality of types of image storage regions for the memory for taking in images and the compression ratio setting unit is used for setting a compression ratio for each of the image storage regions.

The image storage regions and their position information and compression ratios set in the compression condition setting block are stored in the compression condition storage unit of the image compression block. The compressed data generation unit of the image compression block generates a compressed data for each of the image storage regions according to the image storage regions and the compression ratio stored in the compression condition storage unit and stores the generated data in the data storage medium of the image compression block.

Moreover, the compressed data decompression unit of the image reconstruction block separately decompresses the compressed data of the respective image storage regions stored in the data storage medium according to the compression ratios stored in the compression condition storage unit and the image reproduction unit of the image reconstruction block relocates the decompressed data on memory for image reproduction so as to be reproduced according to the position information of the respective image storage regions stored in the compression condition storage unit.

With this configuration, it is possible to set an image storage region and its compression ratio according to an image to be handled. Accordingly, the apparatus can handle various images.

Moreover, among the components associated with the image processing apparatus, the compression condition setting block, i.e., the region setting unit and the compression ratio setting unit can be omitted by storing in advance image storage regions and their position information and compression ratios in the compression condition storage unit. Such a configuration is effective when the importance of the image information within an image is not changed, for example, when the image processing apparatus is constructed in a camera for a definite-point monitoring in which the same type of image is always located in the same position within an image.

BRIEF DESCRIPTION OF THE DRAWINGS

FIG. 7(a) is a conceptual view of an image data stored in memory of the main controller; and FIG. 7(b) and FIG. 7(c) show images cut off from the image data and subjected to an image processing for eliminating the distortion.

FIGS. 15(a) and 15(b) are conceptual views of the contents of the image compression condition.

DESCRIPTION OF THE PREFERRED EMBODIMENTS

Figure 5:
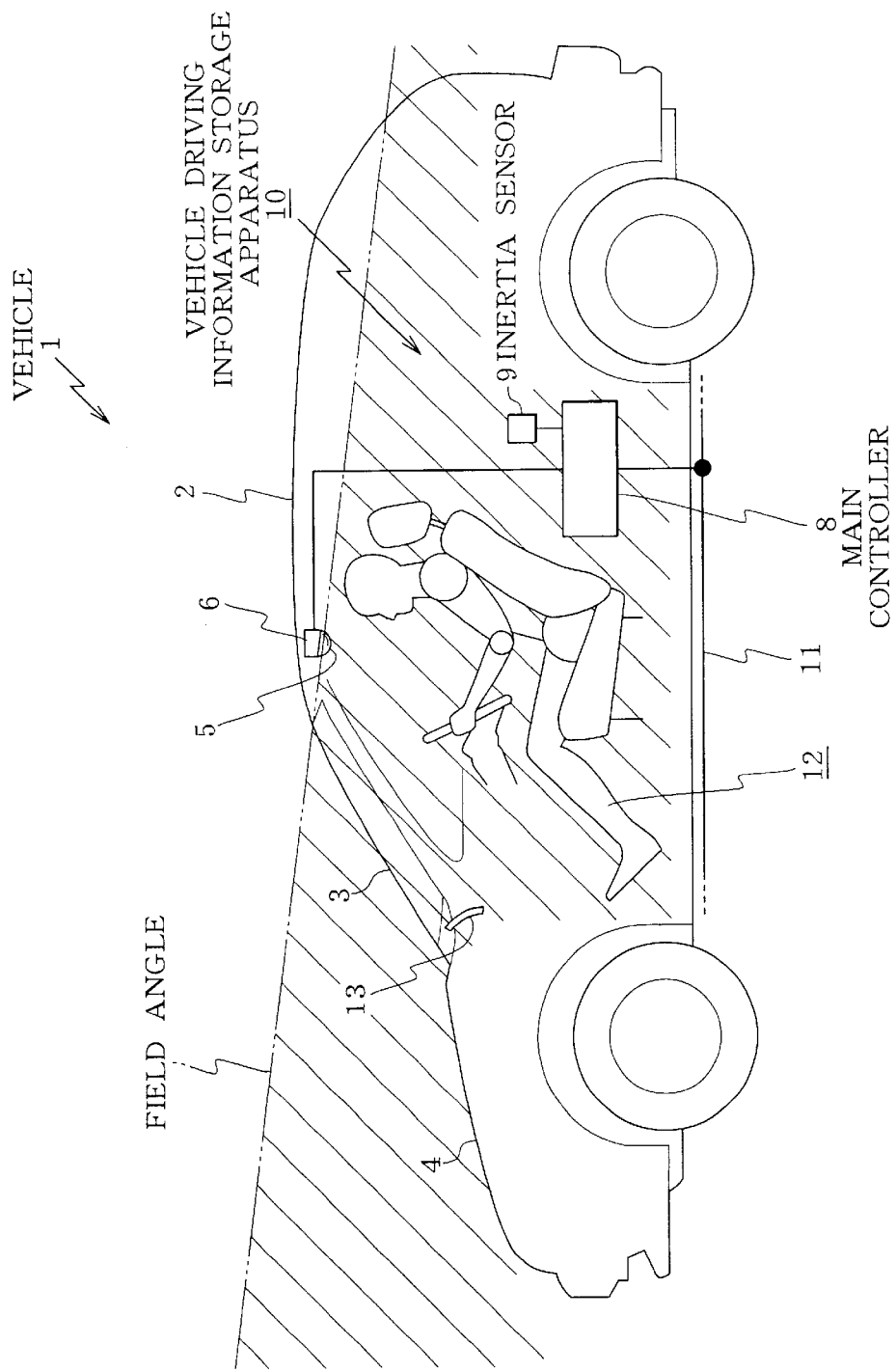
FIG. 5 is a conceptual view of an embodiment when the vehicle driving information storage apparatus according to the present invention is mounted on a test vehicle used in a vehicle collision test.

Description will now be directed a first embodiment of the present invention with reference to the attached drawings. FIG. 5 is a conceptual view of an embodiment when the vehicle driving information storage apparatus according to the present invention is mounted on a test vehicle 1 used in a vehicle collision test. The test vehicle 1 is shown only with a roof 2, a front glass 3, and a bonnet 4.

The vehicle driving information storage apparatus 10 according to the present embodiment includes: a fisheye lens 5 which is a type of the wide angle lens; a CCD camera body 6 having a function as a signal output unit for outputting as a digital signal the image filmed by the lens 5; a main controller 8 (see FIG. 1) having memory M1 and M2 constituting the first and the second latest image storage unit and a CPU 7 serving as a necessary image data storage unit which are built in a shock-proof casing 14; and an inertia sensor as a unit for detecting a state change. Furthermore, the main controller 8 is connected to an in-vehicle LAN 11 such as Ethernet or IrDA provided in a vehicle test factory, so as to detect via the LAN various information items associated with the driver 12 (dummy in this case) and the test vehicle 1 such as a shock to the driver 12, vehicle speed, accelerator open degree, steering wheel angle, turn signal light and other light ON/OFF state, and the like.

The fisheye lens 5 substantially has a field angle of 180 degrees and is mounted on the back surface of the roof 2 so as to simultaneously film the driver 12 and the interior and exterior of the test vehicle. Furthermore, the fisheye lens 5 is mounted with a certain angle on the back of the roof 2 so as to be advantageous for filming the region of the elevation angle in the running direction. Moreover, a convex mirror 13 is fixed onto the dash board of the test vehicle 1 located within a range of the image angle of the fisheye lens 5, so as to oppose to the fisheye lens 5. Via this convex mirror 13, the driver 12 including his/her expression is filmed substantially from the front.

Figure 6:
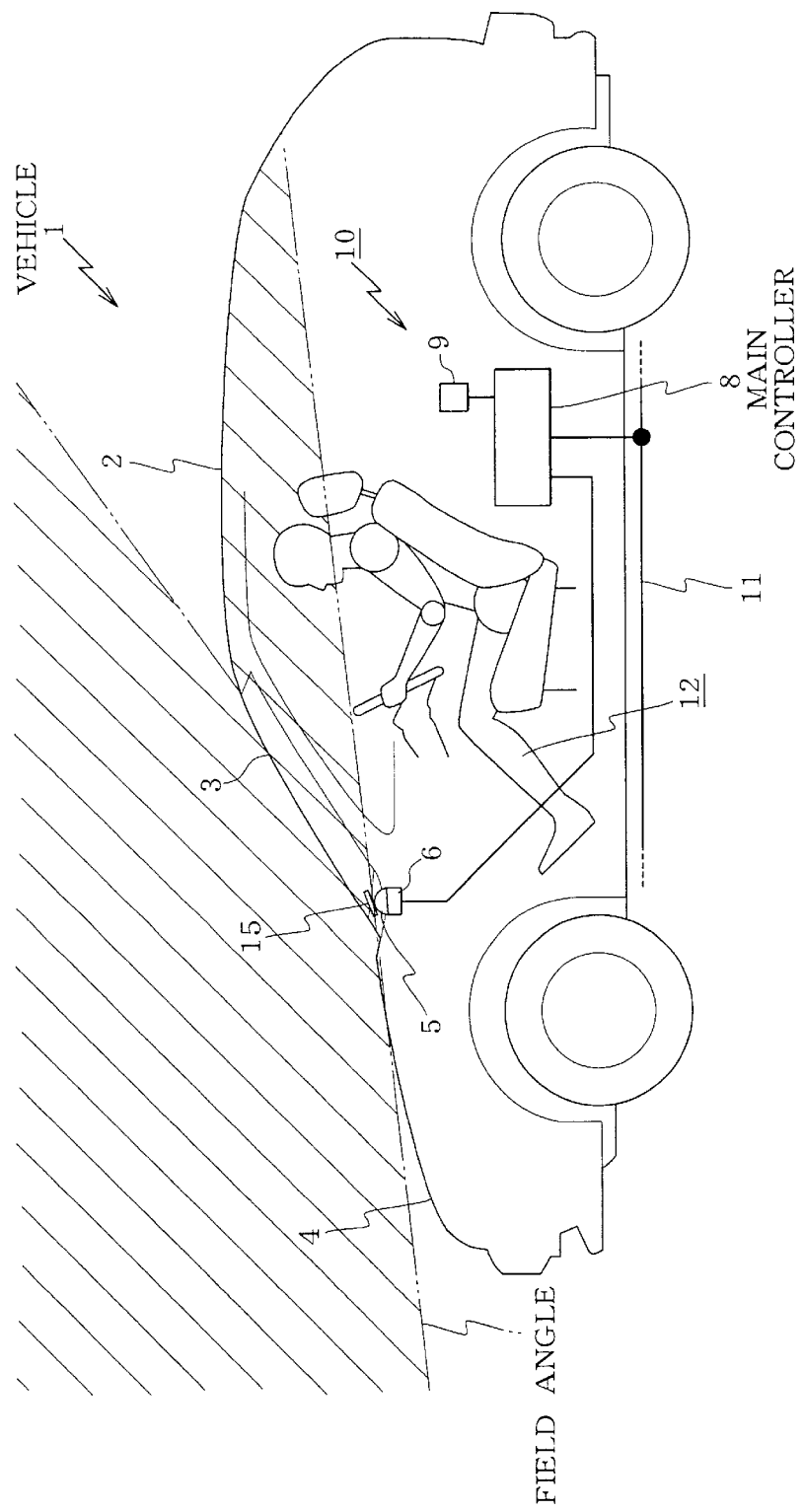
FIG. 6 is a conceptual view of another embodiment when the vehicle driving information storage apparatus according to the present invention is mounted on at test vehicle used in a vehicle collision test.
Figure 8:
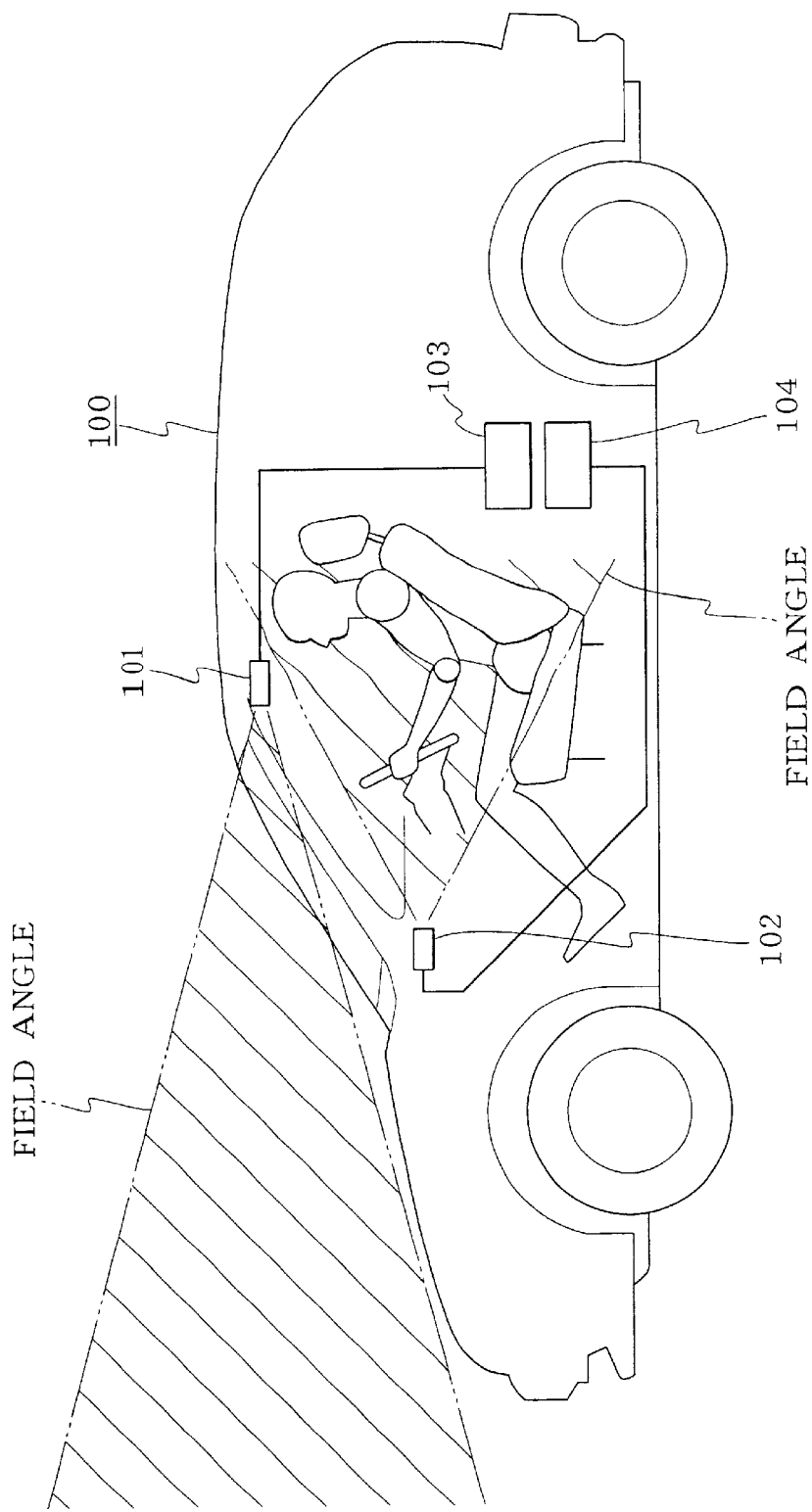
FIG. 8 is a conceptual view showing an outline of configuration of a conventional driving information storage apparatus.

Moreover, as shown in FIG. 6, it is possible to mount the fisheye lens 5 and the CCD camera body 6 on the dash board of the test vehicle 1. In this case, the field of view in front of the bonnet 4 is slightly deteriorated but there is a merit that the expression of the drier 12 can be directly filmed. When the embodiment of FIG. 6 is applied to a vehicle running on a road, there is a possibility that the fisheye lens 5 is exposed direct to the sun and the exposure of the area to be filmed is relatively 'under', causing under-exposure. Accordingly, it is preferable to provide a filming auxiliary member 15 such as a light-shading hood cutting off a direct sung light or an ND filter (extinction filter) around the fisheye lens 5 so that the image inside the vehicle is not in under-exposure. Of course, there is no problem if the CCD latitude of the CCD camera body 6 is sufficiently wide.

Figure 1:
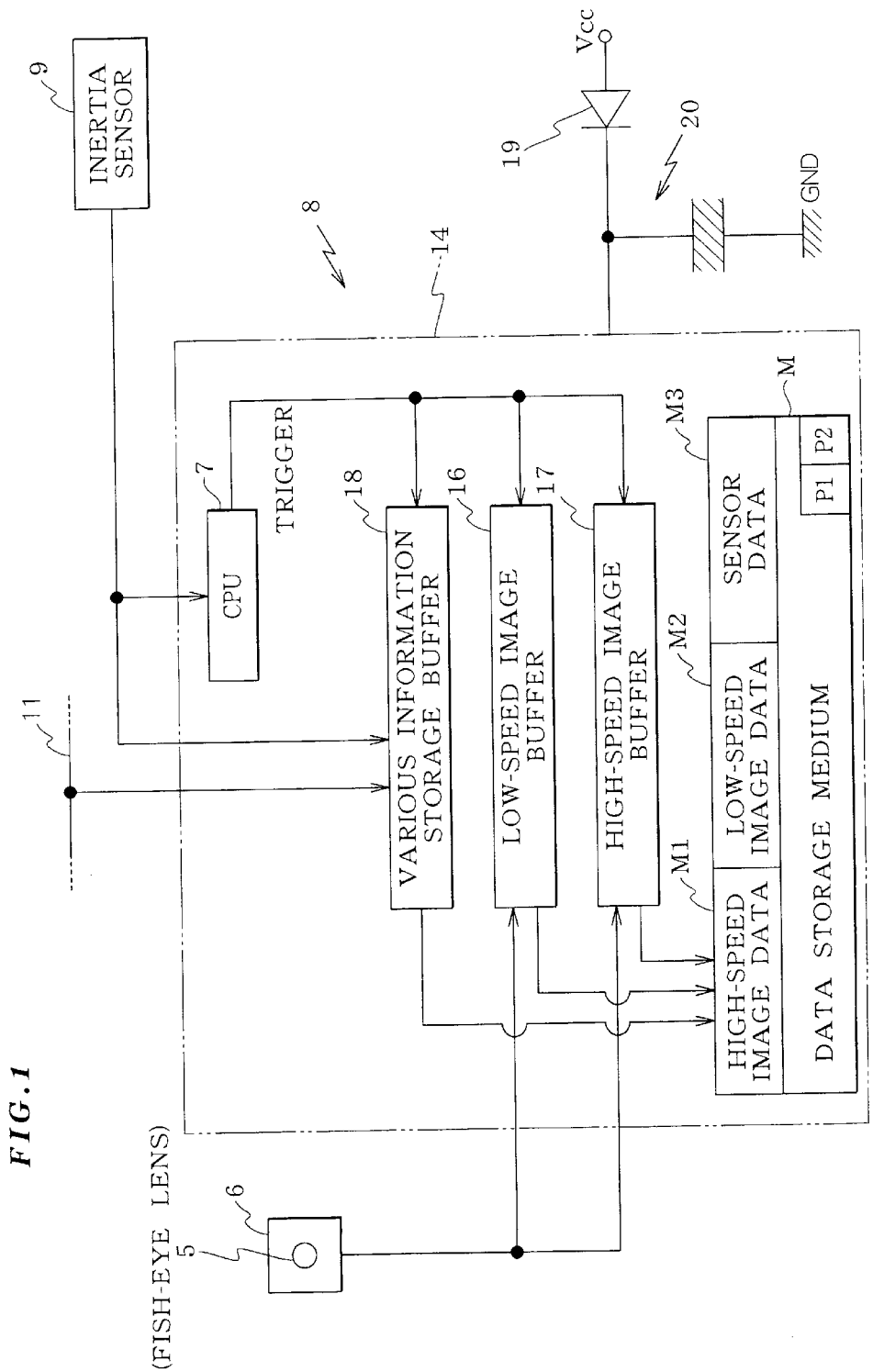
FIG. 1 is a block diagram showing a configuration of a main controller of a vehicle driving information storage apparatus according to an embodiment of the present invention.

FIG. 1 is a block diagram showing the configuration of the main controller 8 of the vehicle driving information storage apparatus 10. As has been described above, the CCD camera body has a function to output as a digital signal the image filmed by the fisheye lens 5 and the digital data of the image filmed by the fisheye lens is repeatedly overwritten in a low-speed image buffer 16 and a high-speed image buffer 17 at a high speed: The low-speed image buffer 16 and the high-speed image buffer 17 need a memory capacity for storing at least one-shot image data. In each of the low-speed image buffer 16 and the high-speed image buffer 17, only the latest one-shot image filmed by the fisheye lens 5 is refreshed and stored.

Moreover, in a various information storage buffer 18, various latest information associated with the driver 12 and the test vehicle 1 are repeatedly overwritten at a high speed via the LAN 11. The various information storage buffer 18 need have a memory capacity for storing only one set of various information such as a shock applied to the driver 12, a vehicle speed, an accelerator open degree, a steering wheel angle, a turn signal light and other light on/off state, and the like. The various information storage buffer 18 always contains only one set of the latest information associated with the driver 12 and the test vehicle 1.

It should be noted that the data write cycle from the CCD camera body 6 and the LAN 11 to the buffers 16, 17, and 18 are preferably shorter than the write cycle from the buffers 16, 17, and 18 to the memories M2, M1, and M3.

The inertia sensor 9 as a condition change detection unit outputs a driving condition sudden change signal to the CPU 7 when the acceleration functioning on the inertia sensor 9 is suddenly changed, for example, when the test vehicle 1 is subjected to a sudden brake or a collision.

The operation of the CPU as the necessary image data storage unit will be detailed later with reference to a flowchart.

The memory M1 constituting a first latest image storage unit, the memory M2 constituting a second latest image storage unit, and the memory M3 as a condition detecting unit for storing a data from the LAN 11 are provided in a data storage medium M capable of a high-speed writing. In this embodiment, a storage capacity is allocated so that the memory M1 can store jmax=1000 shot images, the memory M2 can store imax=9000 shot images, and the memory M3 can store imax=9000 shot images to match with the number of images stored in the memory M2.

The memory M1 stores images for accurately analyzing an instantaneous condition change of the driver 12 and inside and outside the vehicle 1 immediately before and after a moment of a sudden brake or collision. Moreover, the memory M2 stores images for roughly grasp a condition change of the driver and a condition change inside and outside the test vehicle 1 over a comparatively long period of time before and after a moment of a sudden driving condition change.

Since the write cycle of images to the memory M1 is set shorter (faster) than the write cycle of images into the memory M2, by analyzing the image data stored in the memory M1, it is possible to accurately analyze a sudden condition change immediately before and after a moment of a sudden driving condition change. Moreover, since the image write cycle into the memory M2 is set for a longer period of time, even when images are stored for a comparatively long period of time before and after a moment of a sudden driving condition change, the number of frames is comparatively small and the storage capacity of the images is not increased significantly, For example, when the image write cycle into the memory M1 is T1=1/200 seconds, the memory M1 can store images (1000 shots) for 5 seconds. Moreover, when the image write cycle into the memory M2 is T2=1/30, the memory M2 can store images (9000 shots) for 5 minutes. The memory capacity required for the memories M1 and M2 is only for 10000 shots.

If a single memory is used for storing images for 5 minutes at write cycle of 1/200 seconds, a storage capacity for 60000 shots is required. However, in the present embodiment, by using two memories M1 and M2 having different write cycles, the total of necessary memory is reduced to about 1/6.

Moreover, the data storage medium M has a storage area (see FIG. 1) for storing values of pointers P1 and P2 for specifying the moment of the sudden driving condition change by utilizing the image write timing.

The electric power required for drive of the aforementioned CPU 7 and buffers 16, 17, and 18 and write operation into the data storage medium M is normally supplied from a battery Vcc of the test vehicle 1. Between the main controller 8 and the battery Vcc, there is arranged a diode 19 for preventing a reverse current. Furthermore, between the main controller 8 and the diode 19, a capacitor 20 of a large capacity is connected in parallel. Even when the test vehicle 1 is deteriorated and no power is supplied from the battery Vcc to the main controller 8, the capacitor 20 takes the place of the battery Vcc can supply power to the main controller 8 for a certain period of time. The capacitor 20 is an operation power backup unit in the present embodiment.

Figure 2:
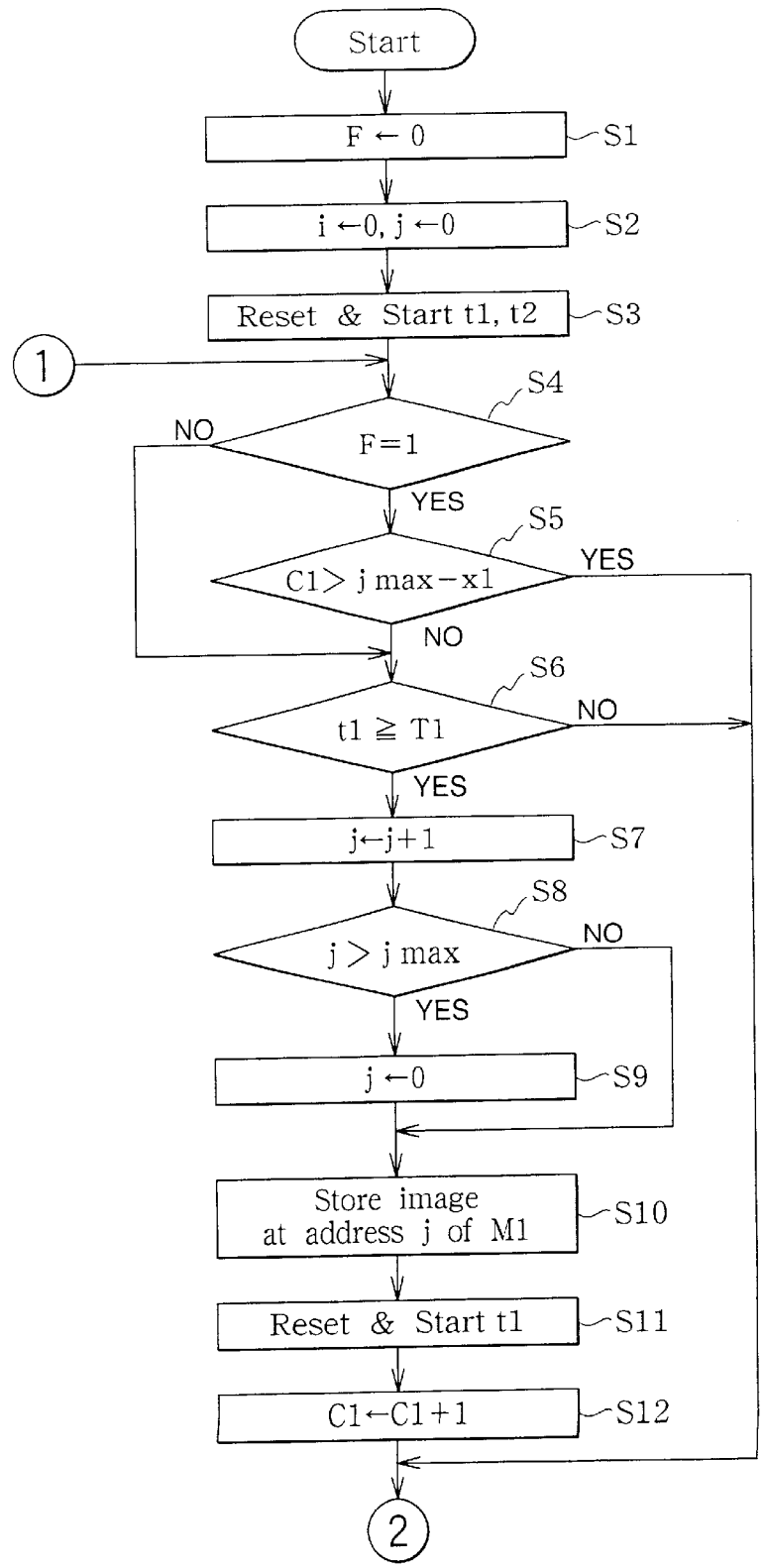
FIG. 2 is a flowchart showing an outline of the processing executed by the CPU of the main controller.
Figure 3:
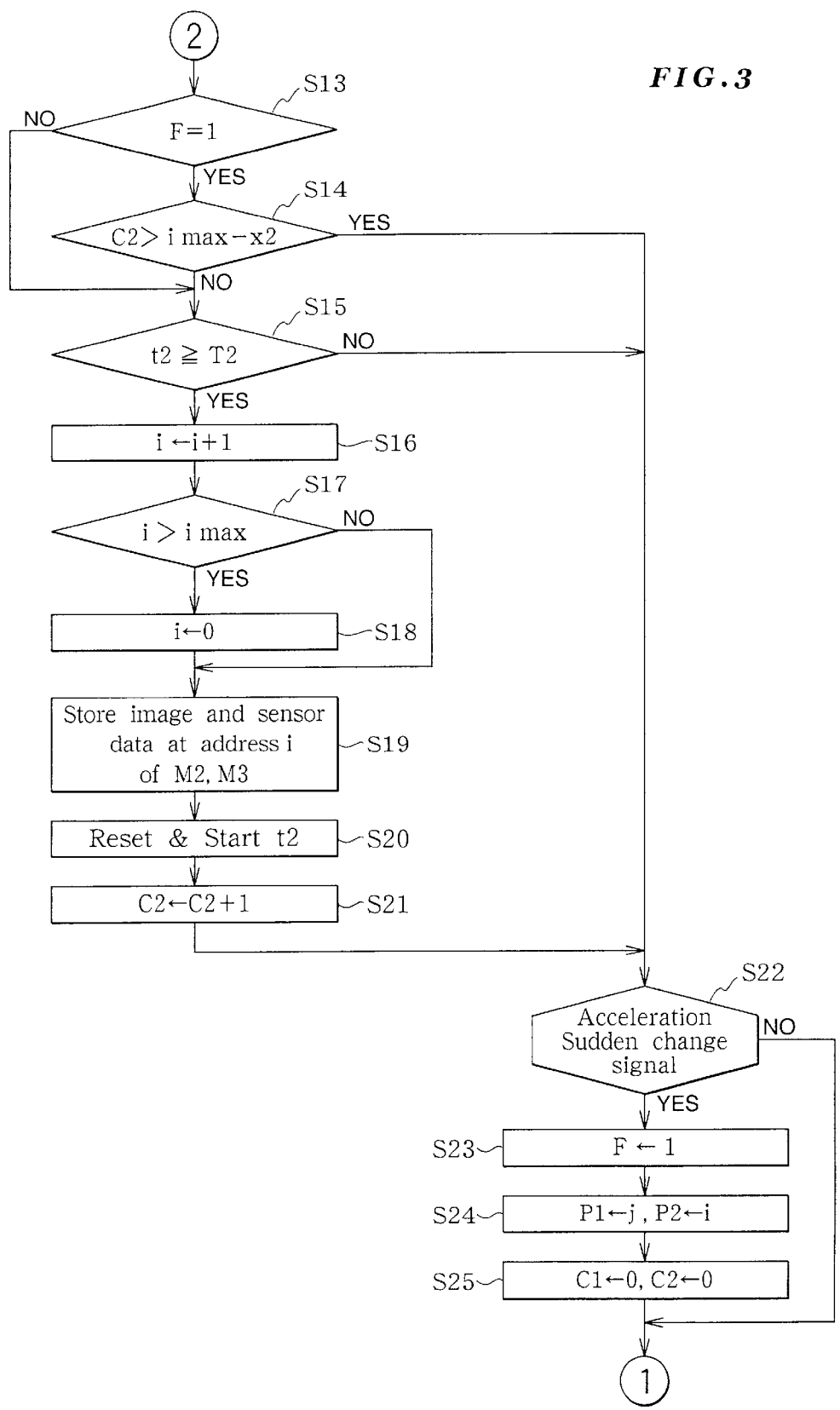
FIG. 3 is a continuation of the flowchart showing the outline of the processing executed by the CPU of the main controller.

FIG. 2 and FIG. 3 are a flowchart showing an outline of the processing executed by the CPU 7 of the main controller 8. Hereinafter, explanation will be given on the processing of the CPU 7 as a necessary image data storage unit with reference to FIG. 2 and FIG. 3.

When power is turned on to the main controller 8, the CPU 7 firstly resets a sudden change signal detection flag F (step S1), sets an initial value 0 in the index j storing an address of the image data write position for the memory M1 and index i storing an address of the image data write position for the memory M2 (step 2), and resets to re-start a timer t1 for regulating the image data write timing in the memory M1 and a timer t2 for regulating the image data write timing in the memory M2 (step S3).

Next, the CPU 7 determines whether a sudden change signal detection flag F is set (step S4). At the state immediately after the power is turned on, the sudden change signal detection flag F is not and accordingly, the decision result of step S4 is false. Next, the CPU determines whether the time lapse counted by the timer 11 has reached the image data write cycle T1 (for example, 1/200 seconds) in memory M1 (step S6).

If the time lapse counted by the timer t1 has not reached the write cycle T1, the image data stored in the high-speed image buffer 17, i.e., the latest image data filmed by the fisheye lens 5 and the camera body 6 need not be written in the memory M1 as the first latest image storage unit. Accordingly, the CPU 7, without executing the processes of steps S7 and S12 required for image write, passes control to the process of step S13 again to determine whether the sudden change signal detection flag F is set.

At the stage immediately after the power is turned on, the sudden change signal detection flag F is not set and accordingly, the decision result of step S13 is false. Next, the CPU 7 determines whether the time lapse counted by the timer T12 has reached the image data write cycle T2 (for example, 1/30 seconds) in the memory M12 (step S15).

If the time lapse counted by the timer T12 has not reached the image data write cycle T2 in the memory M2, the image data stored in the low-speed image buffer 16, i.e., the latest image data filmed by the fisheye lens 5 and the camera body 6 need not be written into the memory M2 and accordingly, the CPU 7, without executing the processes of steps S16 to S21, passes control to step S22 to determine whether a driving condition sudden change signal has been supplied from the inertia sensor 7. Unless a sudden acceleration change is caused by a collision or a sudden brake, the driving condition sudden change signal is not supplied from the inertia sensor 7 and accordingly, the decision result of step S22 is normally false.

Consequently, the CPU 7 passes control to step S4 to repeat the decision processes of steps S4, S6, S3, S15, and S22 until one of the changes occurs, i.e., the time lapse counted by the timer T11 reaches the write cycle or the time lapse counted by the timer t2 reaches the write cycle T2, or the driving condition sudden change signal from the inertia sensor 7 is detected to set the sudden change signal detection flag F.

While such processes are repeatedly executed, when e time lapse counted by the timer t1 has reached the rite cycle Ti, which is detected by the decision process f step S6, the CPU 7 increments by one the value of the index j storing the address of the image data write position in the memory M1 (step S7) and determines whether the value of the index j exceeds the number of image data shots (for example, 1000) that can be stored in the memory M1 (step S8).

Unless the value of the index j exceeds the number of image data shots jmax, the latest image data in the high-speed image buffer 17 can be written into the memory M1 without overwriting or automatically overwriting on the image data stored and accordingly, the CPU 7 stores the latest image data in the high-speed image buffer 17 as it is into the storage area of the address j in the memory M1 (step S10).

Moreover, if the value of the index j exceeds the number of image data shots jmax that can be stored in the memory M1, the CPU resets the value of the index j to the initial value 0 (step S9) and sores the latest image data in the high-speed image buffer 17 into the memory M1, starting at the head of the storage area (step S10).

Next, the CPU 7 resets and re-start the timer t1 for regulating the image data write timing into the memory M1

(step S11) and increments by one the value of the counter C1 counting the number of times image data is taken in after a detection of the driving condition sudden change signal (step S12).

At this stage, the drive condition sudden change signal from the inertia sensor 7 has not been detected or the sudden change'signal detection flag F has not been set. Accordingly, the value of the counter C1 has no substantial meaning.

On the other hand, while the decision processes of the aforementioned steps S4, S6, S13, S15, and S22 are repeatedly executed, if the decision process of step S15 detects that the time lapse counted by the timer t2 has reached the write cycle T2, the CPU increments by one the value of the index i storing the image data write position in the memory M2 and the address of various information write position in the memory 3 (step S16) and determines whether the value of the index i exceeds the number data items imax (for example, 9000) that can be stored in the memory M2 and M3 (step S17).

Unless the value of the index i exceeds the number of data items imax that can be stored, the latest image data in the low-speed image buffer 16 can be written in the memory 2 and the latest information in the various information storage buffer 18 can be written into the memory M3 without overwriting or automatically overwriting on the image data and the various data which have been stored up to now. Accordingly, the CPU, according to the current value of the index i, stores the image data of the low-speed image buffer 16 in the storage area of address i in the memory M2 and the latest data of the various information storage buffer 18 in the storage area of address i in the memory M3 (step S19).

Moreover, if the value of the index i exceeds the number of data items imax that can be stored in the memory M2 and M3, the CPU 7 resets the value of the index i to the initial value 0 (step S18) and starts storing the latest image data of the low-speed image buffer 16 and the latest information of the various information storage buffer 18 at the head of the storage area of the memory M2 and M3 (step S19).

Next, the CPU 7 resets and re-start the timer t2 for regulating the image data write timing with respect to the memory M2 (step S20) and increments by one the value of the counter C2 for counting the number of times data has been taken into the memory M2 and M3 since detection of the driving condition sudden change signal (step S21).

However, at this stage, the driving condition sudden change signal from the inertia sensor 7 has not been detected and the sudden change signal detection flag F as not be set. Accordingly, the value of the counter C2 as no substantial meaning.

As has been described above, each time the time lapse counted by the timer ti reaches the write cycle t1, the processes of steps 7 to 12 are repeatedly executed. Moreover, each time the time lapse counted by the timer 2 reaches the write cycle t2, the processes of steps S16 to S21 are repeatedly executed.

As a result, the memory 1 constituting the first latest image storage unit is successively supplied with images filmed by the fisheye lens 5 and the camera body 6 at T1 (for example, 1/200 seconds) cycle. From the images, only the jmax shots (for example, 1000 shots) filmed for the latest T1×jmax seconds (for example, 5 seconds) are preserved along the time axis according to the first-in-first-out principle. Moreover, the memory 2 constituting the second latest image storage unit is successively supplied with images filmed by the fisheye lens 5 and the camera body 6 at T2 (for example, 1/30 seconds) cycle. From the images, only the imax shots (for example, 9000 shots) filmed for the latest T2×imax seconds (for example, 5 minutes) are preserved along the time axis according to the first-in-first-out principle. Similarly, the memory 3 is successively supplied with various information items associated with the driver 1 and the test vehicle 1 at T2 (for example, 1/30 seconds) cycle. From these information items, only the imax sets for example, 9000 sets) of data filmed for the latest T2×imax seconds (for example, 5 minutes) are preserved long the time axis according to the first-in-first-out principle.

While the aforementioned processes are repeatedly executed, if the test vehicle 1 is subjected to a sudden brake or collision, this is detected by the inertia sensor 7 as the condition change detection unit, which outputs a driving condition sudden change signal to the CPU 7 as a necessary image data storage unit.

The CPU 7 as the necessary image data storage unit detects the driving condition sudden change signal in the decision process of step S22 and sets the sudden change signal detection flag F (step S23). The CPU stores in the pointer P1 for storing the moment when the driving condition sudden change has occurred, the current value of the index j, i.e., the address j indicating a storage area in the memory M1 where an image data write was performed when the driving condition sudden change occurred; and stores in the pointer P2, the current value of the index i, i.e., address i indicating the storage area of memory M2 and the storage area of memory M3 where a data write was performed when the driving condition sudden change occurred (step S24).

Next, the CPU 7 initializes to zero the value of the counter C1 that counts the number of times image data take-in has been performed with respect to the memory M1 and the value of the counter C2 that counts the number of times data take-in has been performed with respect to the memory M2 and M3 since detection of the driving condition sudden change signal (step S25) and passes control to the process of step S4 to determine whether the sudden change signal detection flag F is set.

Since the sudden change signal detection flag F has been set at this state, the decision result of step S4 is true. Next, the CPU determines whether the current value of the counter C1 has reached jmax−x1 (step S5).

The x1 is a parameter to determine how many shots of image data prior to occurrence of the driving condition sudden change are to be left in the memory M1 and how many shots of image data after the occurrence of the driving condition sudden change are to be taken in. According to this parameter, x1 shots of image data prior to the occurrence of the driving condition sudden change are left in the memory M1 and jmax−x1 shots of new image data after the occurrence of the sudden change are taken in.

The x1 setting range is: $0<x1<jmax$. For example, if x1=imax is set, no new data is taken in after the occurrence of the driving condition sudden change and the jmax shots of image data prior to the occurrence of the sudden change are preserved as they are in the memory M1. Moreover, if x1=0 is set, the image data prior to the occurrence of the sudden change is entirely deleted and jmax shots of new image data after the occurrence of the driving condition sudden change are taken into the memory M1.

In general, it is important to know the driving condition before and after the occurrence of a sudden change and the x1 (integer) is set to a value about x1=jmax/2. For example, if jmax=1000, x1 can be set to a value such as x1=500.

Here, if the decision result of the aforementioned step S5 is false, i.e., if the current value of the counter C1 has not reached jmax−x1, the CPU executes the processes of steps S7 to S12 for each T1 cycle, and continues to take in the image data after the occurrence of the driving condition sudden change. Moreover, the value of the counter C1 is incremented each time the image data is taken in (step S12).

On the other hand, if the decision result of step S5 is true, i.e., if the jmax−x1 shots of image data after the driving condition sudden change have been taken into the memory M1, then the CPU as the necessary data storage unit, without executing steps S6 to S12, inhibits overwrite of a new image data in the memory M1. Accordingly, the image data stored in the memory M1 at this stage, i.e., the x1 image data items before the occurrence of the sudden change and the jmax−x1 image data items after the occurrence of the sudden change are preserved as they are in the memory M1.

The data amount stored before the occurrence of the driving condition sudden change corresponds to T1×x1 seconds (2.5 seconds assuming that T1=$\frac{1}{200}$, jmax=1000, and x1=500). Moreover, the data amount stored after the occurrence of the driving condition sudden change corresponds to T1×(jmax−x1) seconds (2.5 seconds assuming that T1=$\frac{1}{200}$, jmax=1000, and x1=500).

Next, the CPU 7 determines whether the sudden change signal detection flag F is set (step S13). Since the sudden change signal detection flag F has been set at this stage, the decision result of step S13 is true. Next, the CPU 7 determines whether the current value of the counter C2 has reached imax−x2 (step S14).

The x2 is a parameter to determine how many shots of image data and various data prior to occurrence of the driving condition sudden change are to be left in the memory M2 and M3 and how many shots of data after the occurrence of the sudden change are to be taken in. According to this parameter, x2 shots of data prior to the occurrence of the driving condition sudden change are left in the memory M2 and M3 and imax−x2 shots of new data after the occurrence of the sudden change are taken in.

The x2 setting range is: 0<x2 <imax. For example, if x2=imax is set, no new data is taken in after the occurrence of the driving condition sudden change and the imax shots of data prior to the occurrence of the sudden change are preserved as they are in the memory M2 and M3. Moreover, if x2=0 is set, the data prior to the occurrence of the sudden change is entirely deleted and imax shots of new data after the occurrence of the driving condition sudden change are taken into the memory M2 and M3.

In general, it is important to know the driving condition before and after the occurrence of a sudden change and the x2 (integer) is set to a value about x2=imax/2. For example, if imax 9000, x2 can be set to a value such as x2=4500.

Here, if the decision result of the aforementioned step S14 is false, i.e., if the current value of the counter C2 has not reached imax−x2, the CPU executes the processes of steps S16 to S21 for each T2 cycle, and continues to take in the image data and various data after the occurrence of the driving condition sudden change. Moreover, the value of the counter C2 is incremented each time the data is taken in (step S21).

On the other hand, if the decision result of step S14 is true, i.e., if the imax−x2 shots of data after the driving condition sudden change have been taken into the memory M2 and M3, then the CPU as the necessary data storage unit, without executing steps S15 to S21, inhibits overwrite of a new data in the memory M2 and M3. accordingly, the data stored in the memory M2 and M3 at this stage are preserved as they.

Accordingly, as has been described above, the memory 2 and M3 contain at both sides of the boundary of the address stored in the pointer P2, the x2 shots of data before the occurrence of the driving condition sudden change and the imax−x2 shots of data after the occurrence of the driving condition sudden change. The data amount stored before the occurrence of the driving condition sudden change corresponds to T2×x2 seconds (2 minutes and 30 seconds assuming that T2=$\frac{1}{30}$, imax=9000, and x2=4500). Moreover, the data amount stored after the occurrence of the driving condition sudden change corresponds to T2×(imax−x2) seconds (2 minutes 30 seconds assuming that T2=$\frac{1}{30}$, imax=9000, and x2=4500).

When the inertia sensor 7 is actuated by an extremely sudden brake or collision, the test vehicle 1 and components mounted on it may be deteriorated, disabling power supply from the battery Vcc to the main controller 8. As has been described above, the main controller 8 is connected to the capacitor 20 as the operation power backup unit. When the power supply from the battery Vcc is cut off, the power supply from the capacitor 20 to the main controller 8 is automatically started. Accordingly, data storage after an occurrence of a driving condition sudden change can be performed without fail. Moreover, the main controller 8 is protected by a shock resistant casing 14 and is seldom damaged seriously.

After a collision test or the like is complete, the data storage medium M is taken out of the main controller 8, and the data stored in memory M1, M2, and M3 is read into a personal computer or the like for data analysis. The substantial analysis is performed by displaying the image data stored in memory M1 and M2 on the display screen and by examining the data stored in memory M3 associated with the test vehicle 1 and the driver 12 such as a data on the shock applied to the driver, accelerator open degree, steering wheel angle, turn signal light and other light ON/OFF states, and the like.

Figure 4:
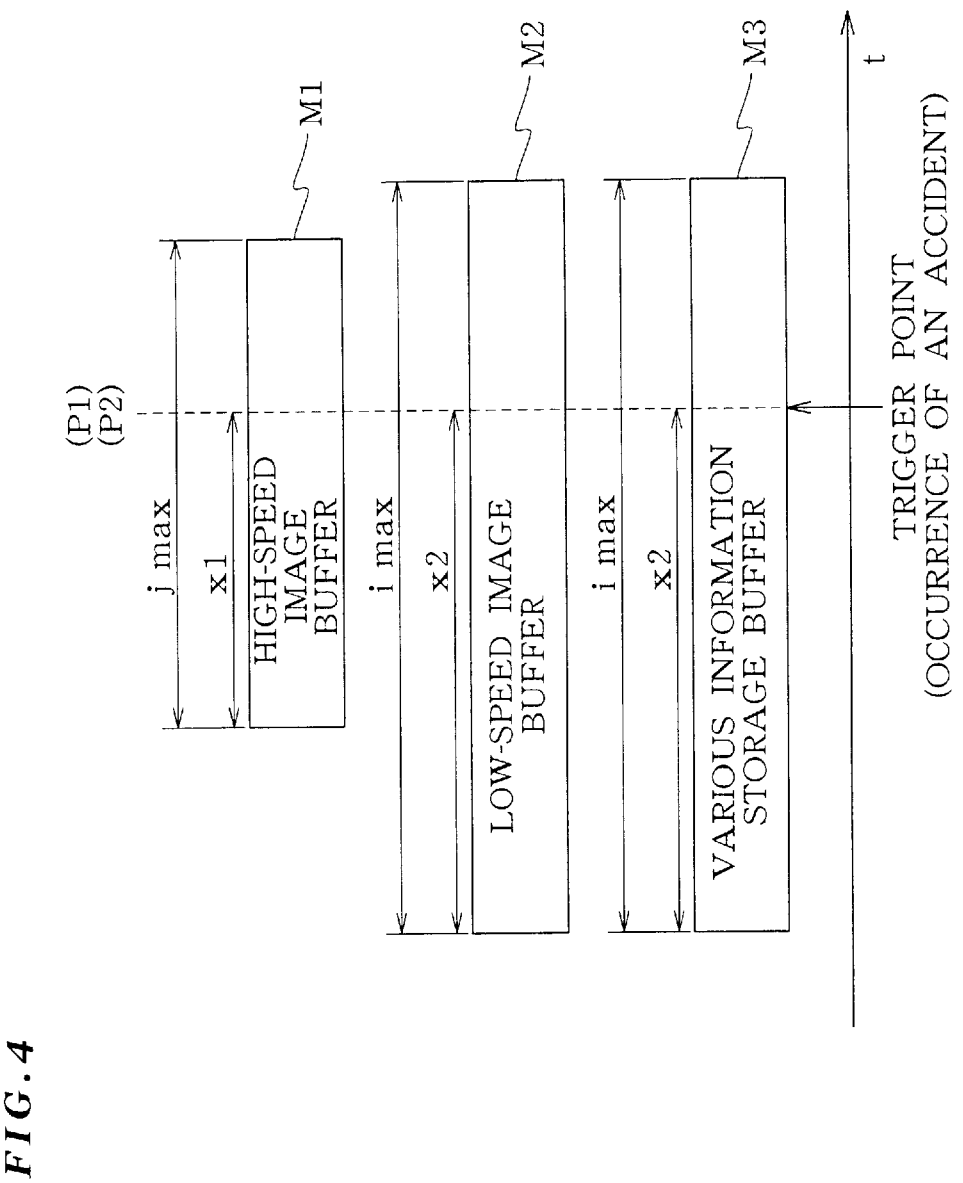
FIG. 4 is a conceptual view of an image data stored in memory, along a time axis based on the moment of a collision generation.

FIG. 4 shows a temporal correspondence between the image data stored in memory M1 and M2 and the various data stored in memory M3. The moment when a driving condition sudden change such as a collision occurred is set to time 0. The image data of memory M1 corresponding to the address of the pointer P1 is matched with this moment and the image data of memory M2 and the various data of memory M3 corresponding to the address of the pointer P2 are matched with this moment. Moreover, the image data on the state of the driver 12 and the state of conditions inside and outside the vehicle have been filmed by the same fisheye lens 5 and stored.

Accordingly, the state of the driver 12 and the state of inside and outside of the test vehicle 1 strictly coincide with each other temporally and there is no possibility of image synchronization lag between them.

The image data filmed by the fisheye lens 5 and the camera body 6 and stored in memory M1 and M2, when displayed as it is, generates a distortion, for example, as shown in FIG. 7(a) because of the optical characteristic of the fisheye lens 5. In order to solve this problem, it is preferable that a portion corresponding to a field of view forward from the vehicle, a portion corresponding to the driver 12, or a portion corresponding to a field of view from the right and left of the test vehicle 1 be cut out from the original data and subjected to an image processing for eliminating the distortion, so that an operator can easily analyze the image data. FIG. 7(b) shows a portion of image data corresponding to a field of view from the front of the vehicle cut out and subjected to an image processing to eliminate the distortion, and FIG. 7(c) shows a portion of image data corresponding to the driver 12 cut out and subjected to an image processing to eliminate the distortion.

When analyzing an accident of an ordinary vehicle having the vehicle driving information storage apparatus 10, it is necessary to analyze the expression and behavior of the driver 12. Accordingly, it is necessary to be able to accurately analyze the image data corresponding to the driver 12.

The image processing technique such as a distortion correction is already known as is disclosed Japanese Patent Publication 9-202180.

When displaying the image data, the display screen may be divided into right and left parts or upper and lower parts so that the image data of the memory M1 and M2 will be displayed in parallel. Moreover, when it is necessary to display a precise image data, the memory M1 or M2 is selected and a particular image, for example, a frame at time zero can be displayed in full screen. It is also possible to scroll the screen to read in and display the following or preceding image data.

Moreover, in this embodiment, the image data stored in the memory M2 and the various data stored in the memory M3 completely coincide with each other in the sampling time and accordingly, it is possible to simultaneously display the various data (numeric data and the like) stored in the memory M3 in a corner of the image data of the memory M2.

Moreover, when it is necessary to check a condition change, looking at the entire image, it is possible to display the image data of the memory M1 and M2 in the thumb nail format arranged in the horizontal direction and scroll the screen in the right-left direction.

In any of the display formats, the time when an image was filmed can be identified from time 0 when the driving condition sudden change occurred, according to the relationship between the address where the image is stored and the address stored in the pointers P1 and P2 and the image take-in cycle Ti and T2. Thus, it is easy to obtain a filming time based on time 0 and it is possible to display the filming time on the screen image. For example, time zero is T, an image stored in an image take-in cycle preceding the address P1 on the time axis in the memory M1 was filmed at 'T−T1', and an image stored at two cycles after the address P2 on the time axis in the memory M2 was filmed at 'T+2×T2'.

Description will now be directed to an image processing method according to a second embodiment of the present invention which is implemented in an image processing apparatus built in a drive recorder B2 for a vehicle with reference to the attached drawings.

Figure 10:
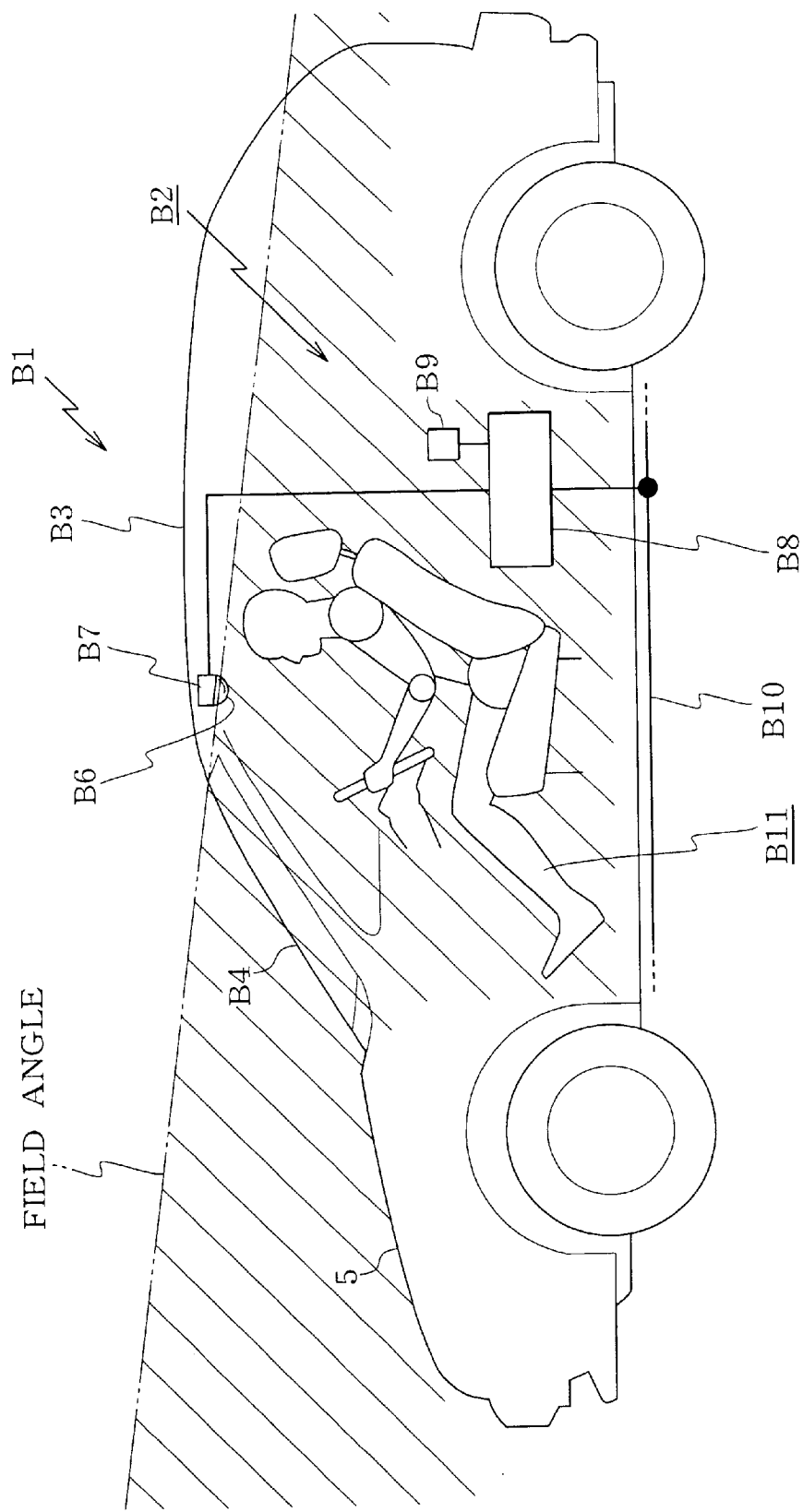
FIG. 10 is a conceptual view of the drive recorder according to the second embodiment of the present invention.

FIG. 10 is a conceptual view of the drive recorder B2 mounted on a test vehicle B1 used for a vehicle collision experiment. The test vehicle B1 is shown in a simplified way only with a roof B3, a front glass B4, and a bonnet B5.

The drive recorder B2 includes a fisheye lens B6 which is a type of a wide angle lens, a CCD camera body B7 for outputting as a digital signal an image filmed by the fisheye lens B6, a main controller B8 having a built-in CPU, ROM, RAM, a large-capacity data storage medium and the like contained in a shock-resistant casing, and a gyro-inertia sensor B9. Moreover, the main controller B8 is connected to a vehicle-mounted LAN system B10 using the communication protocol CAN (Controller Area Network) for vehicles and industrial apparatuses. Via this LAN system B10, it is possible to detect various information associated with a driver B11 (a dummy in this case) and the test vehicle B1 such as a shock applied to the driver B11, a vehicle speed, an accelerator open degree, a steering wheel angle, turn signal light and other light on/off states.

The fisheye lens B6 as a filming unit substantially has a field angle of 180 degrees and is mounted on a back of the roof B3 so as to simultaneously film the driver B11 and the conditions inside and outside the test vehicle B1. Furthermore, the fisheye lens B6 is attached to the back of the roof B3 with an angle to be slanted forward so as to be advantageous for filming the forward region.

Figure 9:
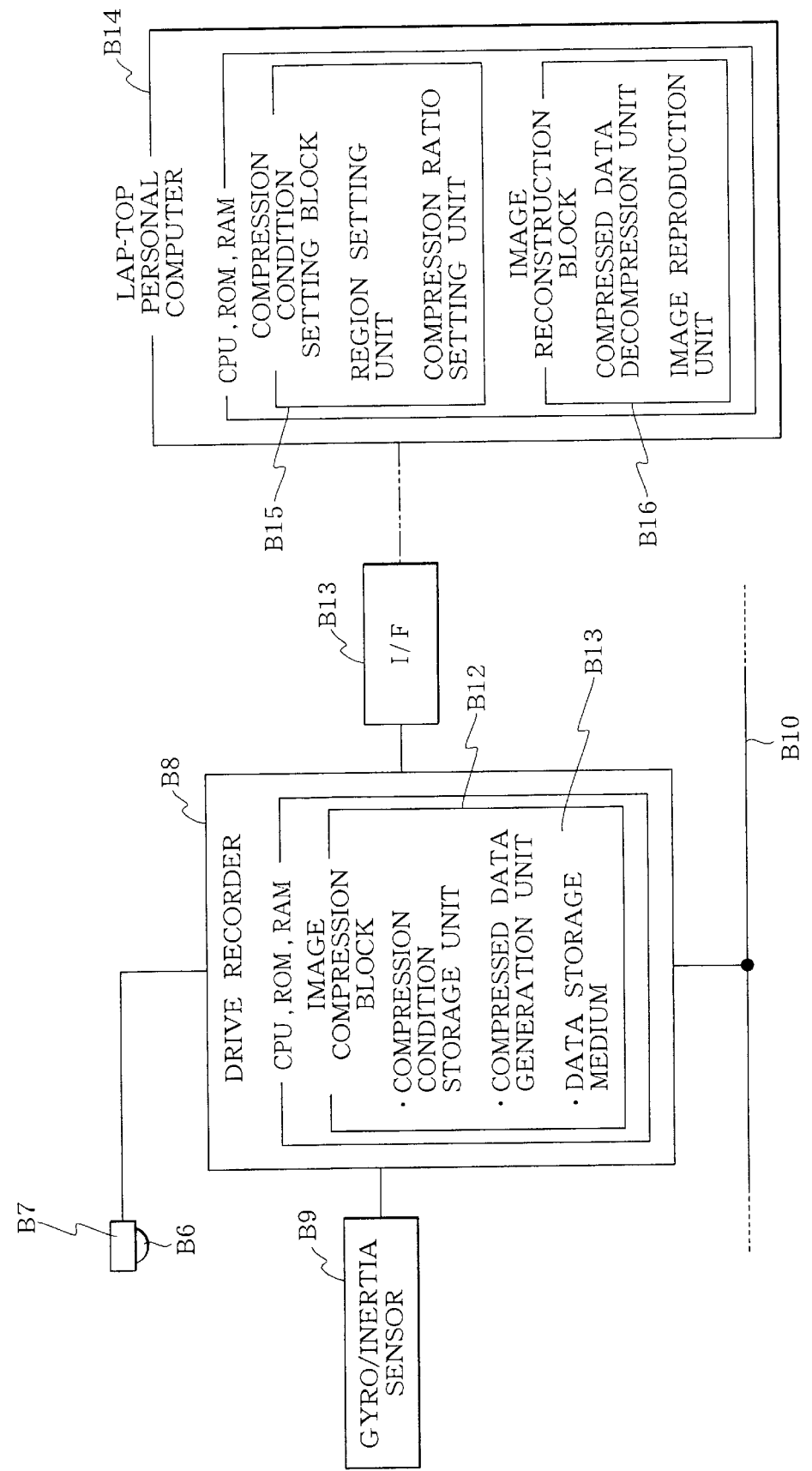
FIG. 9 is a bock diagram showing a configuration of a main controller according to a second embodiment of the present invention.

FIG. 9 is a block diagram showing a simplified configuration of the main controller B8 of the drive recorder B2. The CCD camera body B7 has a function to output as a digital signal the image filmed by the fisheye lens B6. The CCD camera body B7 films an image using the fisheye lens B6 at a predetermined cycle and overwrites the image in a RAM of the main controller B8, i.e., a portion allocated as a frame memory for image take-in.

The CPU arranged in the drive recorder (hereinafter, referred to as a DR CPU) successively takes into a large-capacity primary buffer the image data written in the frame memory. The primary buffer has a capacity for successively storing images filmed for at least 15 seconds. When the storage capacity becomes full of the filmed images, the oldest image stored in the primary buffer is erased to store a new image so that images filmed for the latest 15 seconds are stored.

While the image take-in is performed in such a way, when a trigger signal notifying a driving condition change (collision or sudden brake) such as a shock detection signal from the gyro-inertial sensor B9 is input, the CCD camera body B7 and the DR CPU performs an image take-in and writing into the primary buffer for a predetermined period of time, for example, 5 minutes and then stops these processes, so that the data in the primary buffer is preserved as it is.

Accordingly, the primary buffer contains images of 10 seconds before detection of the trigger signal and 5 seconds after the detection of the trigger signal.

It is possible to store the image data stored in the primary buffer as it is in a data storage medium, but if a plenty of images are stored, there arises a problem that the data capacity increases remarkably. For example, if a vehicle collision test is repeatedly performed and several sets of images of the first buffer are stored in the data- storage medium, the storage capacity becomes enormous. To cope with this, the present embodiment utilizes a function of an image compression block B12 as a part of the image processing apparatus built in the main controller B8, so that the plenty of images in the primary buffer are compressed before stored in the data storage medium.

The image compression block B12 is a component of the image processing apparatus according to the present embodiment, and its main part is made up by the DR CPU, a ROM, a RAM, and the like arranged in the drive recorder B2.

The image compression block B12 includes a data compression function (a compressed data generation unit) and a data storage medium. According to an image storage region set for a frame (image filming region for one shot) and a compression ratio set for each of the image storage region, the data compression function compresses an image data within a frame for each of the image storage regions and the compressed data is stored in a compressed data storage region of the data storage medium. Moreover, a compression condition storage unit is formed utilizing a part of the storage area of the data storage medium for storing an image storage region set for the frame and a compression ratio set for each of the image storage regions.

The other components constituting the image processing apparatus according to the present embodiment, i.e., the compression condition setting block and the image re-construction block are arranged in an external processing apparatus B14 such as a lap-top personal computer provided in such a way that it can be connected to the main controller B8 via an interface circuit B13. If a condition setting keyboard and an expensive monitor apparatus are arranged at the side of the drive recorder, they are subjected to a shock, causing a trouble. Moreover, if the main controller B8 is provided with additional components, the drive recorder B2 becomes bulky, making it difficult to mount the drive recorder B2 in the vehicle.

The external processing apparatus B14 is an ordinary computer including a data input keyboard, a monitor, a CPU (hereinafter, referred to as a PC CPU), ROM, RAM, a hard disc, and the like. The compression condition setting block B15 is made up by the keyboard, the monitor, the PC CPU, ROM, RAM, and the like while the image reconstruction block B16 is made up by the monitor, the PC CPU,.ROM, RAM, and the like.

The compression condition setting block 15 includes a region setting function (a region setting unit) for setting a plurality of types of image storage regions for the frame memory of the main controller B8 and a compression ratio setting function (a compression ratio setting unit) for setting a compression ratio for each of the image storage regions of the frame memory. Moreover, the image reconstruction block B16 includes a compressed data decompressing function (a compressed data decompressing unit) for decompressing the compressed data stored in the data storage medium, according to the compression ratio stored in the compression condition storage unit and an image reproduction function (an image reproduction unit) for relocating the decompressed image on the RAM (image reproduction memory) of the external processing apparatus B14 according to the position information of the respective image storage regions and displaying the decompressed image on the monitor.

Figure 11A:
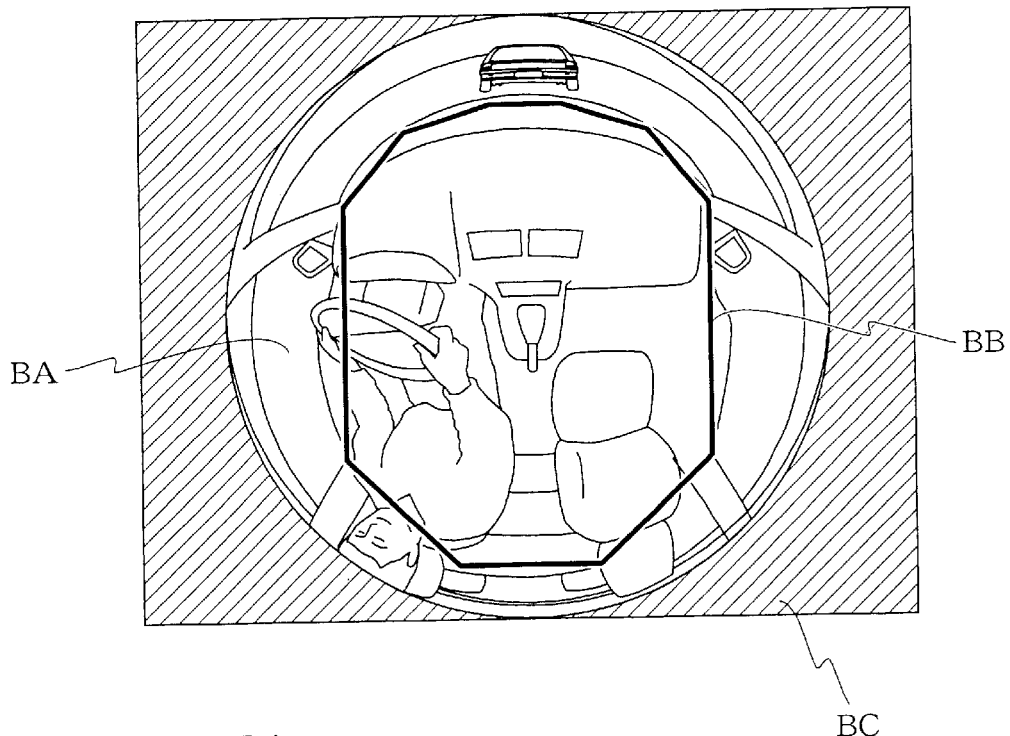
FIG. 11(a) is an example of an image filmed by a fisheye lens.

FIG. 11(a) explains a specific example of an image filmed by the fisheye lens B6 of the drive recorder B2. As has been described above, in the present embodiment, the fisheye lens B6 is used as a filming unit of an image and accordingly, the driver B11 (face and body) and the conditions inside and outside the vehicle form a circular image on a light detecting surface of the CCD camera body B7. In order to form the circular image without eclipse, the diameter of the circular image should be matched with a length of a shorter side of the light detecting surface or smaller than the shorter side. Inevitably, there remains a useless space in the four corners and at the right and left sides of the light detecting surface. when taking in this image, the image on the light detecting surface is scanned from left to right starting at the top line and proceeding to lower lines and accordingly, the data of the useless space is also taken in as the image data, consuming in vain the storage capacity of the data storage medium for storing the image data.

To cope with this, in the present embodiment, the useless region C shown in FIG. 11(a) is defined as an unnecessary region, i.e., the data contained there is to be deleted.

Accordingly, the remaining center portion, i.e., the region actually containing the image filmed by the fisheye lens B6 is a necessary region. This necessary region is further divided into region A (peripheral region) and region B (center portion). In region A, as shown in FIG. 11(a), the condition outside the vehicle and the expression of the driver change according to the vehicle movement. This region A is defined as a region containing an image information of a relatively high importance.

The region B films a seat, an instrument panel, and the body of the driver B11 fixed by the seat belt. These do not change significantly. Accordingly, as shown in FIG. 11(a), this region B is defined as a region containing an image information of a relative low importance.

Figure 12A:
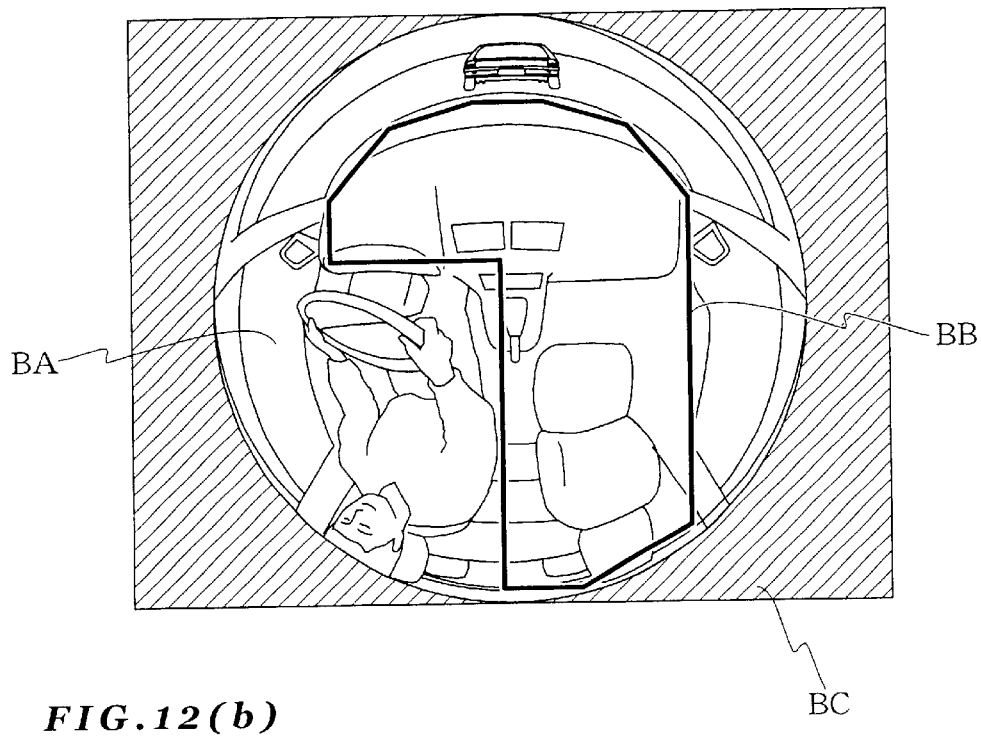
FIG. 12(a) is another example of an image filmed by a fisheye lens.
Figure 13A:
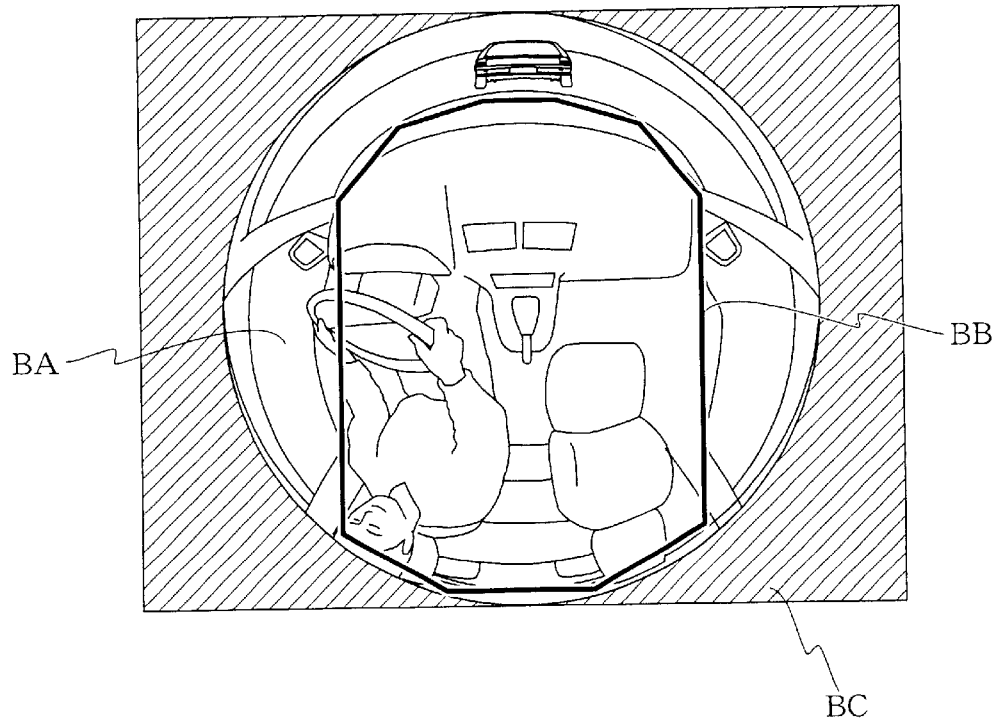
FIG. 13(a) is another example of an image filmed by a fisheye lens.
Figure 13B:
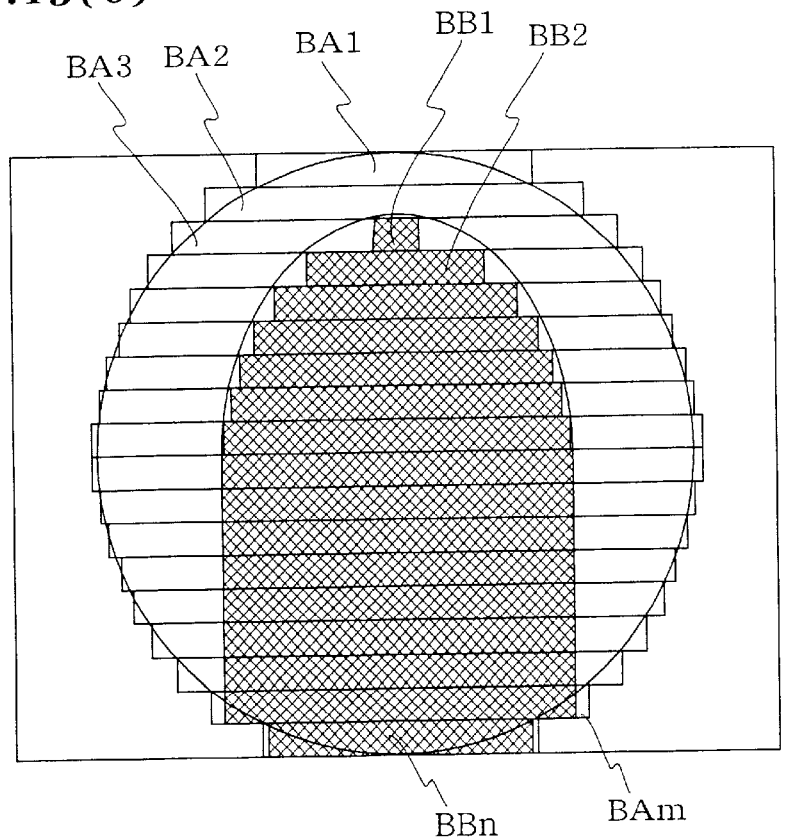
FIG. 13(b) is another view dividing the different regions into rectangular areas.

FIG. 12(a) shows another example of region division. Unlike the example of FIG. 11(a), in FIG. 12(a), the body of the driver 11 is included in region A, i.e., a region containing an image information of a relatively high importance. For example, in a collision experiment, the body of the driver (dummy) B 11 may be subjected to a strong shock and damaged. Such a phenomenon should be preserved in a image of a high quality for data analysis. FIG. 13(a) shows still another example of region division. In this example, importance is put on the condition outside the vehicle and the face of the driver B11 is included in region B, i.e., a region of a lower importance.

Figure 12B:
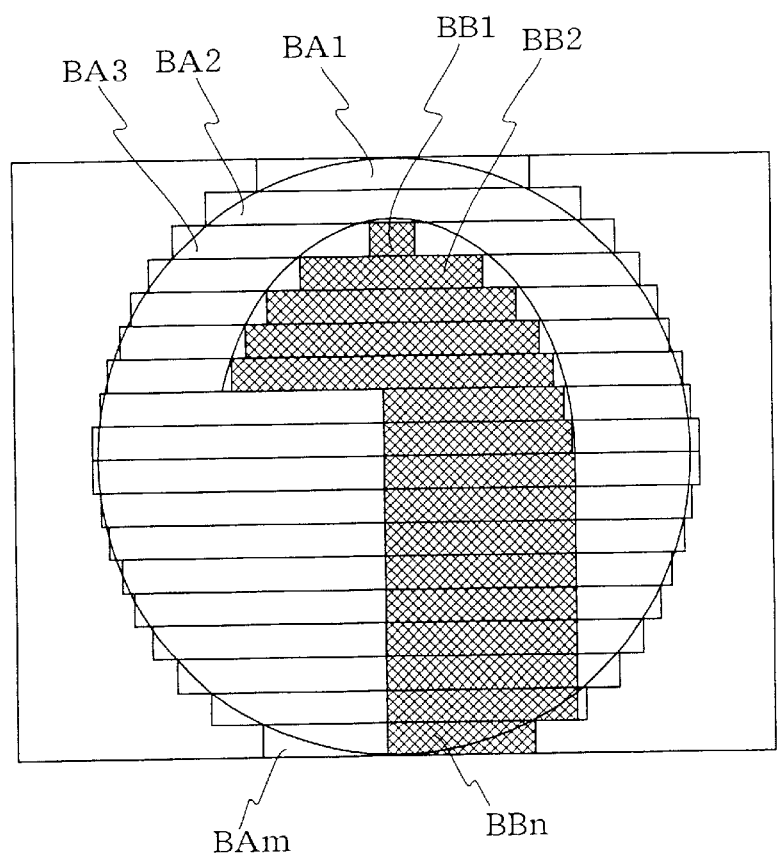
FIG. 12(b) is another view dividing the different regions into rectangular areas.

FIG. 11(a), FIG. 12(a), and FIG. 13(a) only show some examples of the region division. The size and shape of region C (unnecessary portion), region A (of a higher importance) and region B (of.a lower importance) can be set as is necessary. Moreover, in FIG. 11(a), FIG. 12 (a), and FIG. 13(a), each of the region C of an unnecessary portion, region A of a higher importance, and region B of a lower importance is defined as a continuous area. However, each of the regions C, A, and B can be defined as a plurality of areas such as A', A", . . . dispersed.

Moreover, in this embodiment, the conventional JPEG is used as the image data compression method. However, as has been described above, this image compression method scans an image from left to right and from top to bottom to take in an image data in a rectangular frame format and is limited to a rectangular shape of an image that can be scanned. That is, this method is not appropriate to the image data of regions A, B, and C as shown in FIG. 11(a), FIG. 12(a), and FIG. 13(a).

Figure 11B:
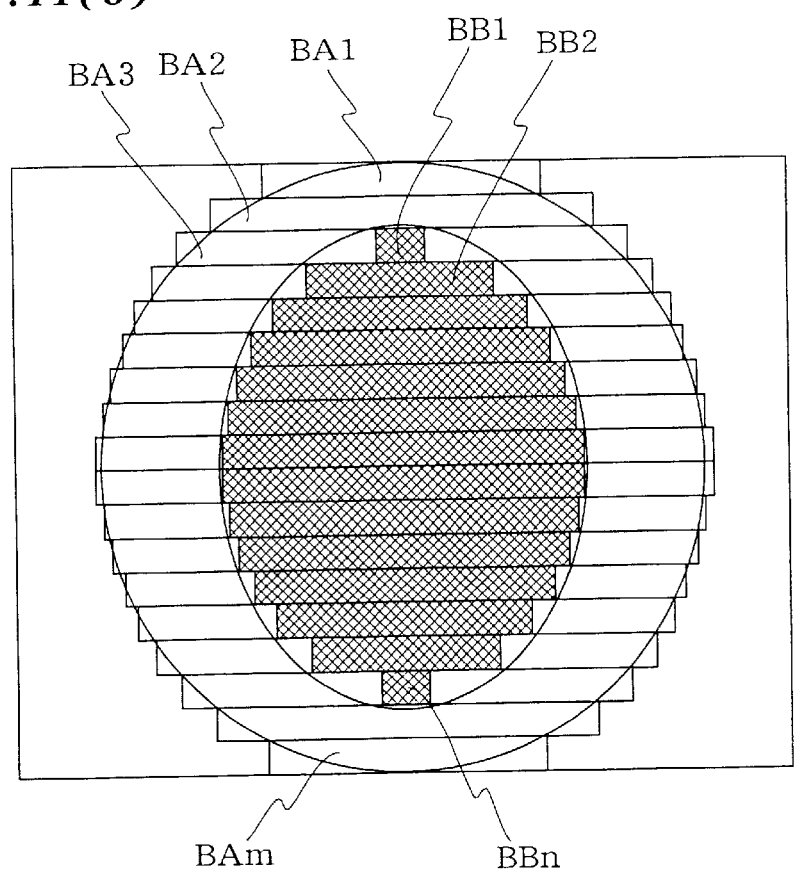
FIG. 11(b) is a view dividing the different regions into rectangular areas.

To cope with this, in this embodiment, as shown in FIG. 11(b) for example, each of the region A containing an image information of a higher importance and region B containing an image information of a lower importance is divided into small rectangular areas A1 to Am and B1 to Bn, respectively, so that an image data of each of the small rectangular areas is extracted separately and compressed and preserved. Thus, regardless of the size and shape of the regions A. B, C, the image data can be compressed as is necessary. That is, the small rectangular areas A1 to Am constitute region A of an irregular shape having a higher importance, and small rectangular areas B1 to Bn constitute region B of an irregular shape having a lower importance. The remaining undefined portion, i.e., a compliment of the regions A and B is the unnecessary portion C.

Figure 17:
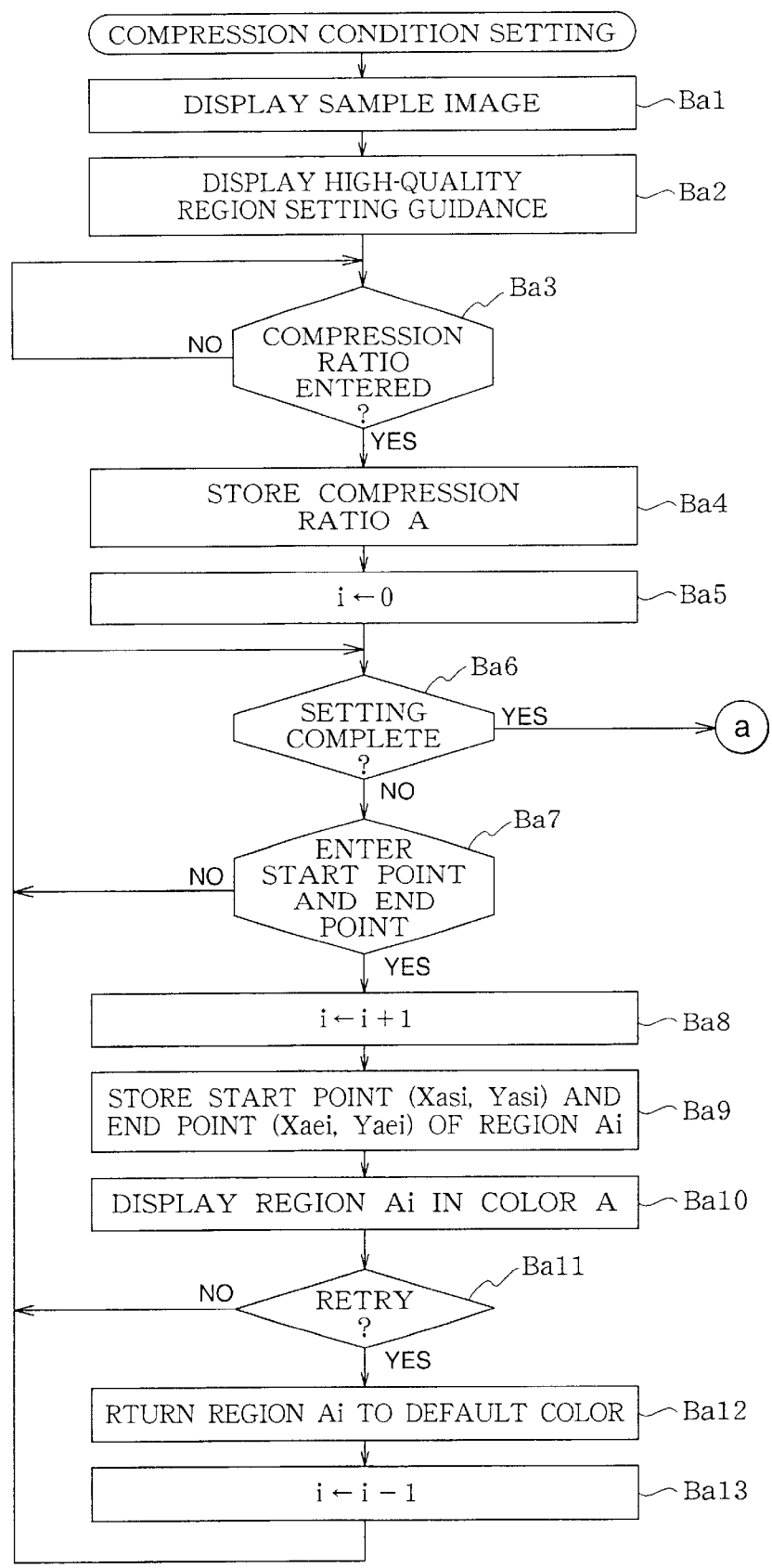
FIGS. 17 and 18 are a flowchart showing an outline of a compression condition setting process.
Figure 18:
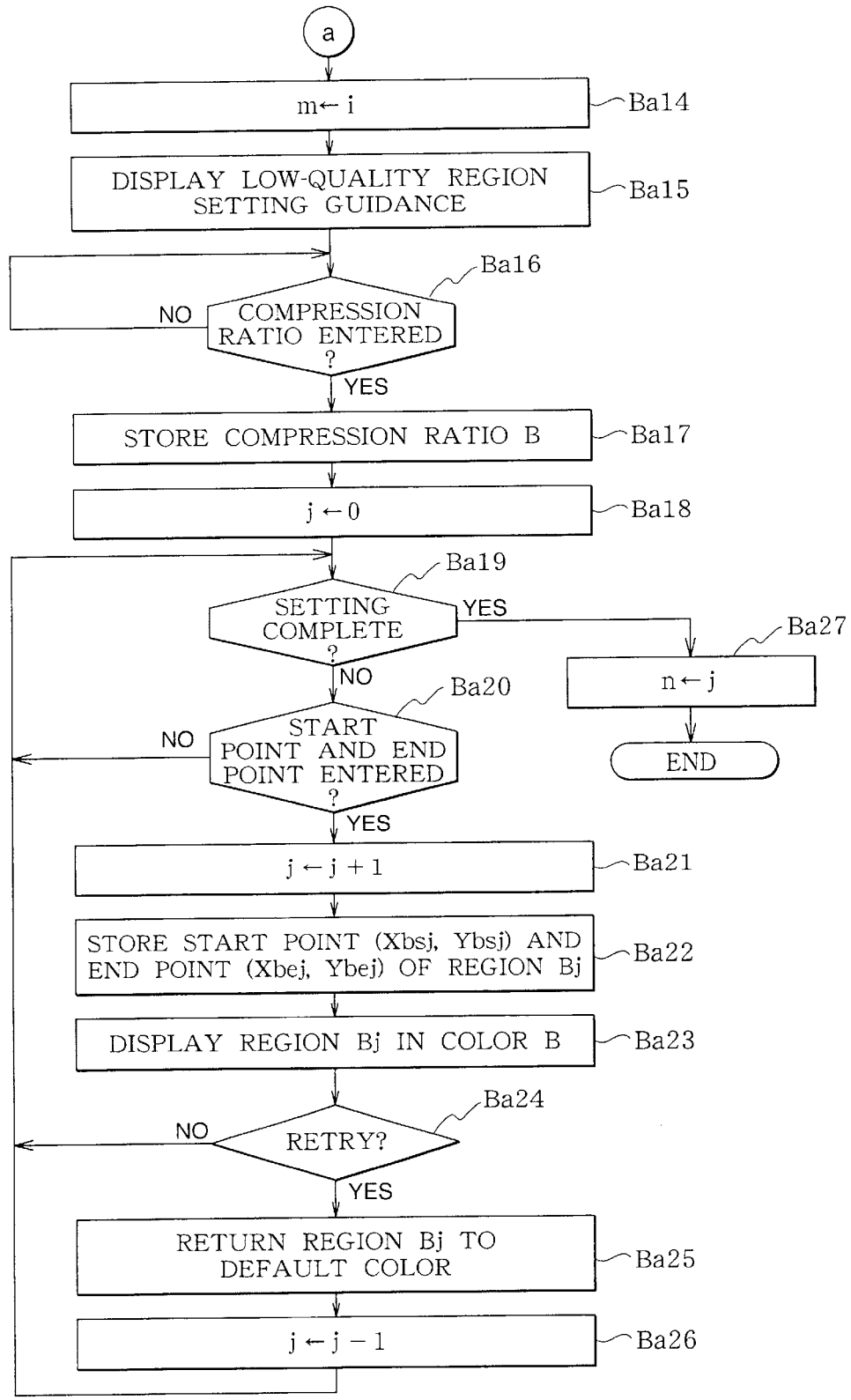

FIG. 17 and FIG. 18 are a flowchart showing an outline of a compression condition setting processing executed utilizing the region setting function and the compression ratio setting function of the compression condition setting block B15, i.e., the PC CPU provided in the external processing apparatus B14 such as a lap-top personal computer. The aforementioned region setting is performed with this external processing apparatus B14 connected via the interface B13 to the main controller B8 of the drive recorder B2 by the operator using a keyboard and a mouse while looking at the monitor of the external processing apparatus B14.

The PC CPU which has started a compression condition setting process, firstly, displays a sample image such as the one shown in FIG. 11(a) on the monitor of the external processing apparatus B14 so as to show the operator an example of an image filmed by the fisheye lens B6 (step a1), displays a region definition method to define a high-quality image region, i.e., region A of a higher importance (such as a numeric input through a key operation and a region specification using a mouse) (step a2), and enters a wait state for the operator to enter a compression ratio (step a3). When a compression ratio is specified by the operator, the PC CPU transfers via the interface B13 and store the specified compression ratio in a compression condition storage block of the data storage medium of the main controller B8 as shown in FIG. 15(a) (step a4).

It is preferable to specify a low image compression ratio for the region A containing an image information of a higher importance so as to improve the reproducibility of the image.

Next, the PC CPU initializes to 0 the value of a counter i for counting the number of the small rectangular areas constituting the region A of a higher importance (step a5). After this, the PU CPU determines whether the setting end key of the external processing apparatus B14 has been depressed (step a6) and determines whether a start point/end point input operation using the mouse has been completed (step a7).

Unless the aforementioned operations are completed, the PC CPU repeatedly executes the decision processes of steps a6 and a7, waiting for the operator to perform one of the operations.

When one of the small rectangular areas constituting the region A of a higher importance is specified by the operator using the mouse, the PC CPU detects this operation in the decision process of step a7, increments by one the value of the counter i counting the number of the small rectangular areas (step a8), corresponds the start point (Xasi, Yasi) and the end point (Xaei, Yaei) of the specified area with the region name Ai, and transfers them to the compression condition storage block of the data storage medium of the main controller B8 as shown in FIG. 15(a) (step a9).

The PC CPU displays the small area defined by this operation with an recognizable color on the sampling image as shown in FIG. 11(a) and informs the operator of he operation result (step a10).

It should be noted that the start point/end point input can be performed, for example, by specifying the upper left point and the lower right point of the small rectangular area with a rubber band using the mouse. The upper left point of the small rectangular area specified by the rubber band corresponds to the start point (Xasi, Yasi) and the lower right point corresponds to the end point (Xaei, Yaei).

Next, the PC CPU determines whether a retry key of the external processing apparatus B14 has been operated (step a11). If the retry key has been operated, the PC CPU resets the color display of the small area specified by the operation this time (step a12), decrements by one the value of the counter i (step a13), and passes control to step a6 and step a7.

If the operator specifies a small area at this stage, the start point and the end point of the small area is stored, i.e., overwritten in the same storage position of the compression condition storage block of the data storage medium. Thus, it is possible to correct a setting mistake of the small rectangular area.

Hereinafter, the operator repeats the aforementioned operation to define a necessary number of small rectangular areas, thus generating, for example, the small rectangular areas A1 to Am shown in FIG. 11(b) to obtain a shape similar to the region A of an irregular shape. Lastly, the operator operates the setting end key of the external processing apparatus B14 to complete the definition of the region A of a higher importance.

As has been described above, the small rectangular areas need not be adjacent to each other as in FIG. 11(b). They can also be defined at separate positions. The region position and the compression ratio are finally stored for each of the small rectangular areas and according to the information, compression and decompression are performed for each of the small rectangular areas. Accordingly, even if the region A consisting of small rectangular areas is dispersed in separate positions such as A', A", . . . , there is no problem concerning the compression, storage, decompression, and relocation.

The setting end key operation by the operator is detected by the PC CPU at the decision process of step a6. Upon detection of this operation, the PC CPU transfers the current value of the counter i, i.e., the total number m of the small rectangular areas constituting the region A to the compression condition storage block of the data storage medium of the main controller B8 as shown in FIG. 15(a) and passes control to a process for defining a low image quality region, i.e., region B of a lower importance.

The definition processing of region B is substantially identical to the definition processing of the region A, i.e., the aforementioned processes of steps a2 to a14, except for that the compression ratio is different and the position data of the small rectangular areas is stored in a different position. Accordingly, a detailed description will be omitted.

By the processes of steps a15 to a27, the image compression ratio of region B and a data on a start point (Xbsj, Ybsj) and an end point (Xbej, Ybej) of a small rectangular area Bj for j=1 to n are stored in the compression condition storage block of the data storage medium of the main controller B8 as shown in FIG. 15(b). It is preferable to set a comparatively high compression ratio for the region B containing an image information of a lower importance, so as to obtain a data compression efficiency rather than the image reproducibility.

An example has been explained concerning the processing for specifying a compression ratio and defining a region for the compression condition storage block of the data storage medium. However, when using the drive recorder B2 for a definite purpose, the regions A, B, and C may be fixed. In such a case, the processes of FIG. 17 and FIG. 18 are not required.

Figure 19:
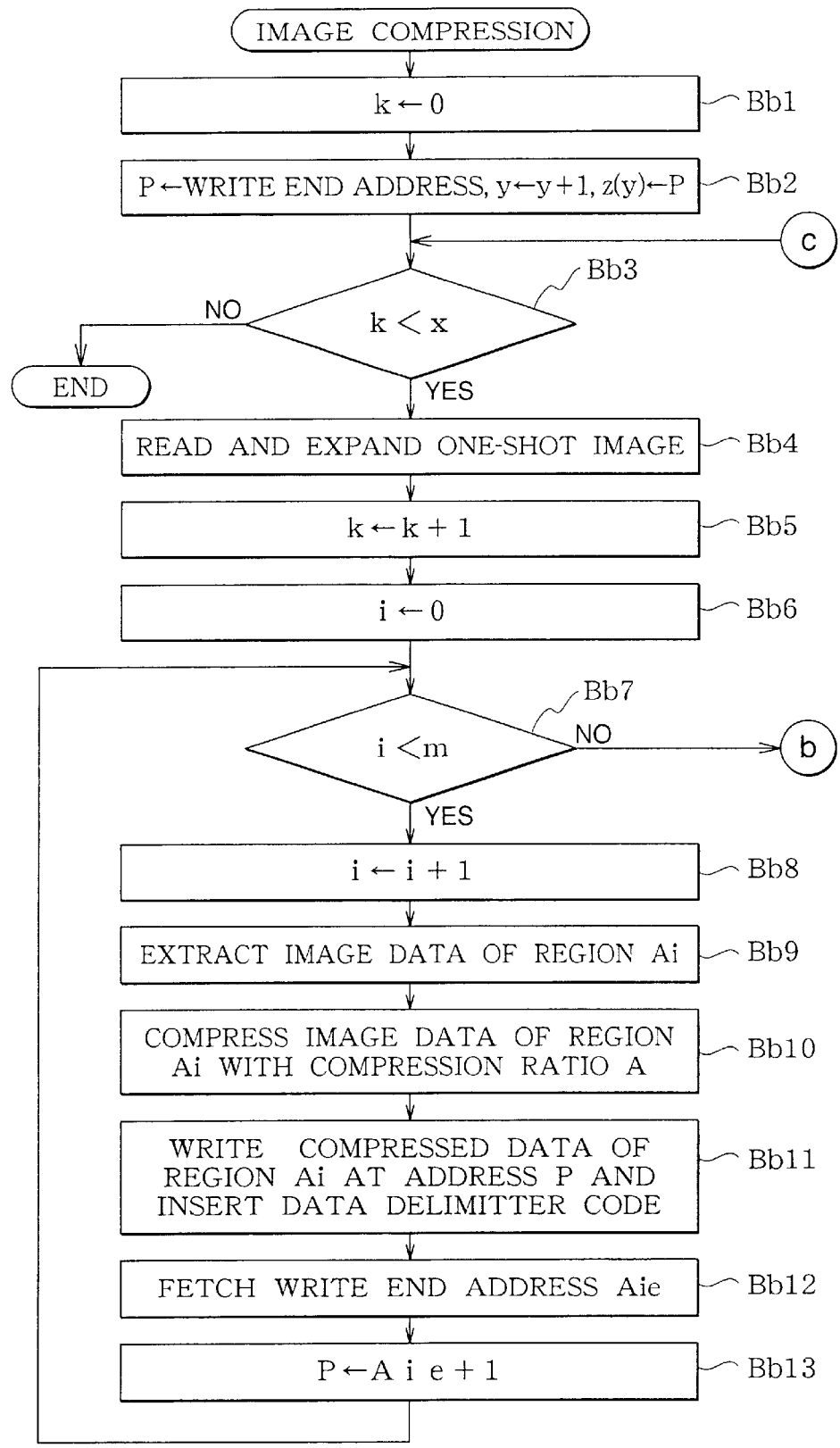
FIGS. 19 and 20 are a flowchart showing an outline of an image compression process.
Figure 20:
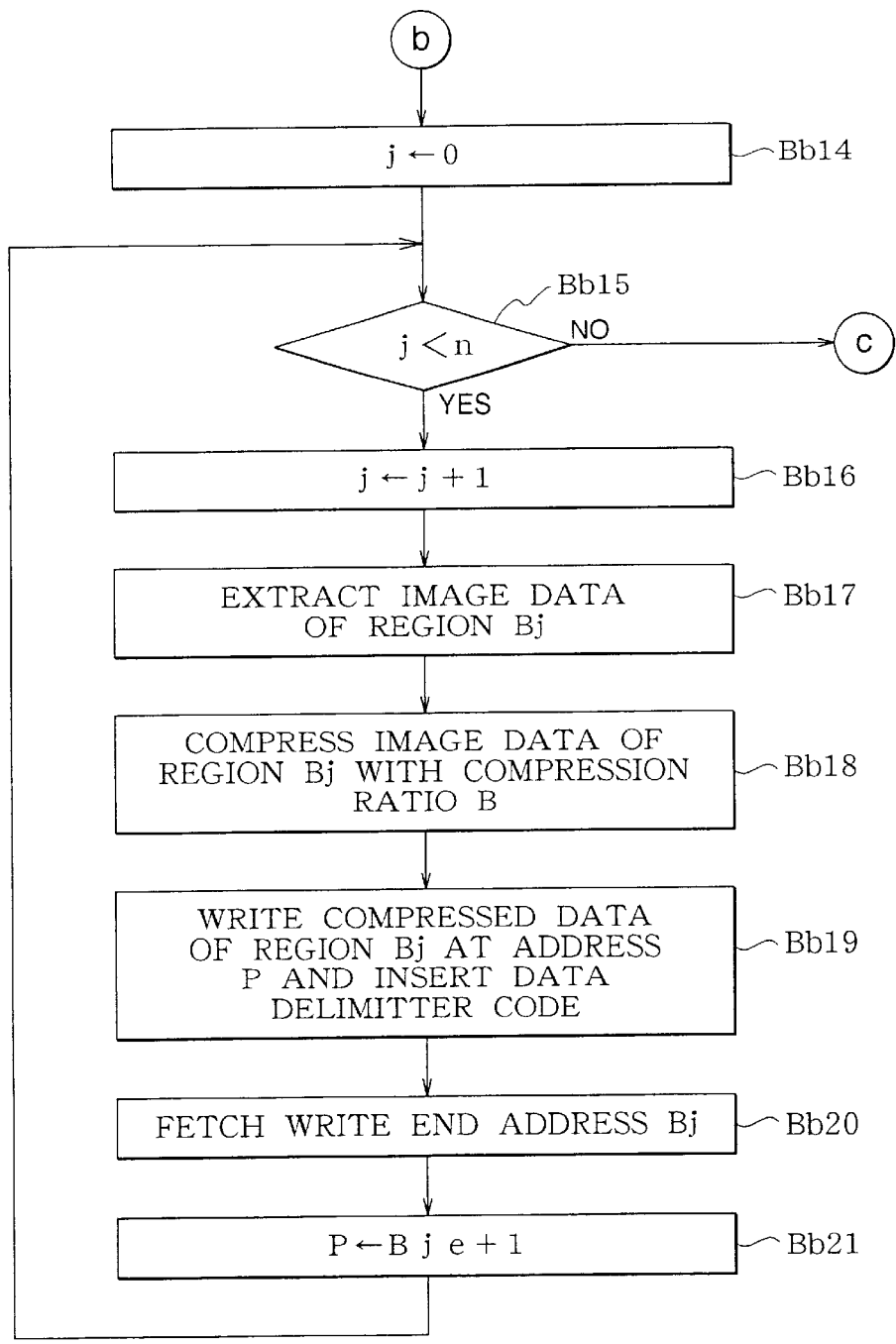

FIG. 19 and FIG. 20 are a flowchart showing an outline of an image compression process performed by the DR CPU using the data compression function of the image compression block B12 when a plenty of images stored in the aforementioned primary buffer are stored in the data storage medium. In the present embodiment, this image compression process is performed 5 seconds after generation of the aforementioned trigger signal.

The DR CPU which has started the image compression process, firstly, initializes to 0 the value of a counter k for counting the number of images taken in from the primary buffer (step b1).

The DR CPU fetches a value of the write end address from the data storage medium and sets the value added by 1 as the compressed data write start position in the pointer p, increments by 1 a counter y (initial value=0) for storing the number of collision experiments performed and stores the value of the point p in a start address storage register z (y) for storing a start address of the image obtained in the y-th collision experiment (step b2).

Next, the DR CPU determines whether the value of the counter k indicating the number of images taken in from the primary buffer has reached the number x of the images stored in the primary buffer, i.e., whether the primary buffer still contains an image to be taken out and stored in the data storage medium (step b3). As has been explained above, the primary buffer stores images filmed at a predetermined cycle for 15 seconds and the storage number x is fixed.

Unless the value of the counter k has reached the storage number x, i.e., if the primary buffer still contains an image to be taken out to be stored in the data storage medium, the DR CPU, firstly, reads in an image data for the oldest one shot in the primary buffer and spreads the data in a memory for an intermediate processing having a configuration identical to a frame memory (step b). Then, the DC CPU increments by one the value of the counter k counting the number of images taken in (step b5) and initializes to 0 the value of the counter i counting the number of small rectangular areas constituting the region A of a higher importance (step b6).

Next, the DR CPU determines whether the current value of the counter i is smaller than the total number m (stored in the compression condition storage block of the data storage medium) of the small rectangular areas constituting region A, i.e., whether the region A of the intermediate processing memory still contains a small rectangular area to be extracted and compressed (step b7).

If the current value of the counter i is smaller than the total number m of the small rectangular areas, i.e., if the region A of the intermediate processing memory still contains a data on a small rectangular area to be compressed, then the DR CPU increments by one the value of the counter i (step b8), references a compression condition storage block as shown in FIG. 15(*a*) to obtain a position data on the start point (Xasi, Yasi) and the end point (xaei, Yaei) of the small rectangular area having a region name .Ai corresponding to the current value of the counter i and scans an image data in that range (step b9), and JPEG-compresses the image data in that range according to the compression ratio A stored in the compression condition storage block as shown in FIG. 15(*a*) (step b10).

Figure 16:
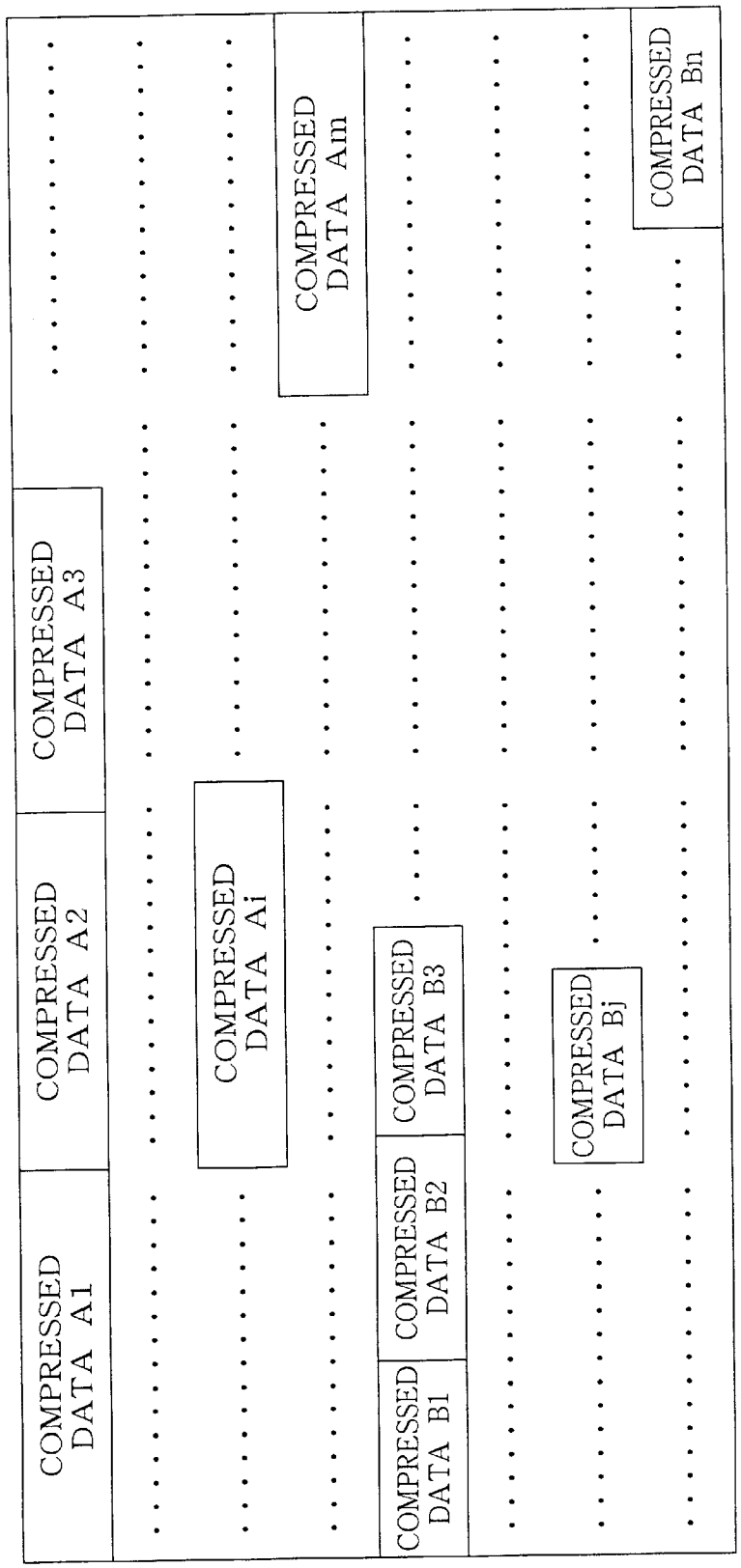
FIG. 16 is a conceptual view of an arrangement of compressed data of the small rectangular areas stored in the compressed data storage region of the data storage region.

The DR CPU writes the compressed data (compressed in step b10) of the small rectangular area having the area name Ai into the compressed data storage region of the data storage medium as shown in FIG. 16, starting at the write start position indicated by the pointer p and inserts a data delimiting code at the write end position (step b11), fetches the address Aie of the final write end position in the compressed data storage region (step b12), increments by one its value and causes the pointer p to store the value (step b13), so as to serve as a write start position of the next compressed data.

The DDR CPU repeats the aforementioned process while incrementing the value of the counter i until the decision result of step b7 becomes false.

When the decision result of step b7 has become false and it is confirmed that all the small rectangular areas constituting the region A have been extracted from the intermediate processing memory, compressed, and stored, the DR CPU starts a processing for extracting, compressing, and storing the small rectangular areas constituting the region B.

The processes associated with the extraction, compression, and storage of the small rectangular areas constituting the region B (steps b14 to b21) are performed by referencing the start/end position data (Xbsj, Ybsj) and (Xbej, Ybej) and the compression ratio B as shown in FIG. 15(*b*) and the processes are substantially identical to the aforementioned processes of steps b6 to b13, i.e., the case for the small rectangular areas constituting the area A. Accordingly, no detailed explanation will be given.

FIG. 16 is a conceptual view of arrangement of compressed data of the small rectangular areas stored in the compressed data storage region of the data storage medium as a one-frame data. The respective compressed data of the small rectangular areas, although compressed by the same compression ratio A or B, have different file sizes according to the small rectangular image areas and the image characteristics but the arrangement order is definite according to the setting order of the small rectangular areas defined in the aforementioned compression condition setting process. Moreover, a data delimiter code is inserted between the respective compressed data of the small rectangular areas. The total number m of the small rectangular areas constituting the region A and the total number n of the small rectangular areas constituting the region B are both known values. The position data of the respective small rectangular areas are all stored in the compression condition storage block of the data storage medium. Accordingly, it is easy to decompress the compressed small rectangular area data and relocate them at the previous position.

Moreover, since the position data is stored for each of the small rectangular areas, even when the region A or region B has been set at a plurality of separate locations, it is possible to reproduce and relocate the images of the small rectangular areas as elements of the region A and region B, thus reproducing an image of a higher image quality region and a lower image quality region.

Lastly, when the decision result of step b15 has become false and it is confirmed that all the small rectangular areas constituting the region B have been extracted from the intermediate processing memory, compressed, and stored, the DR CPU completes a process associated with a compression and storage of one image data fed from the primary buffer, passing control to the decision process of step b3, where the DR CPU determines whether the value of the counter k has reached the storage number x of the images in the primary buffer, i.e., whether the primary buffer still contains an image to be taken out and stored in the data storage medium.

When the decision process of step b3 has become true, i.e., when the primary buffer still contains an image to be taken out and stored in the data storage medium, the DR CPU reads in the next one-shot image data from the primary buffer and spreads it in the intermediate processing memory (step b4) and repeats the processes of step b5 and after in the same way as has been described above.

These processes are repeated until the decision result of step b3 becomes false. When the decision result of step b3 has become false, all the images stored in the primary buffer, i.e., all the images which have been filmed by the CCE camera body B7 for 15 seconds are compressed by the JPEG method and stored in the data storage medium.

Accordingly, one-image compressed data formed by the small rectangular area compressed data as shown in FIG. 16 is stored one after another in the compressed data storage region of the data storage medium, according to the number x of images stored in the primary buffer.

When the image compression process shown in FIG. 19 and FIG. 20 is complete, the CCD camera body B7 and the DR CPU return to a normal processing to resume a filming at a predetermined cycle and image write into the primary buffer.

Moreover, if the trigger signal is input again, in the same way as has been described above, 5-second filming and writing process is performed continuously, after which the image compression shown in FIG. 19 and FIG. 20 is performed and the images stored in the primary buffer at that moment are compressed and stored in the compressed data storage region.

The data storage capacity of the compressed data storage region is sufficiently large as compared to the data storage capacity of the primary buffer and can store several sets of image data when a plurality of collision experiments are repeatedly performed. The start address of the image data obtained in the y-th collision experiment is stored in the start address storage register z (y).

Figure 21:
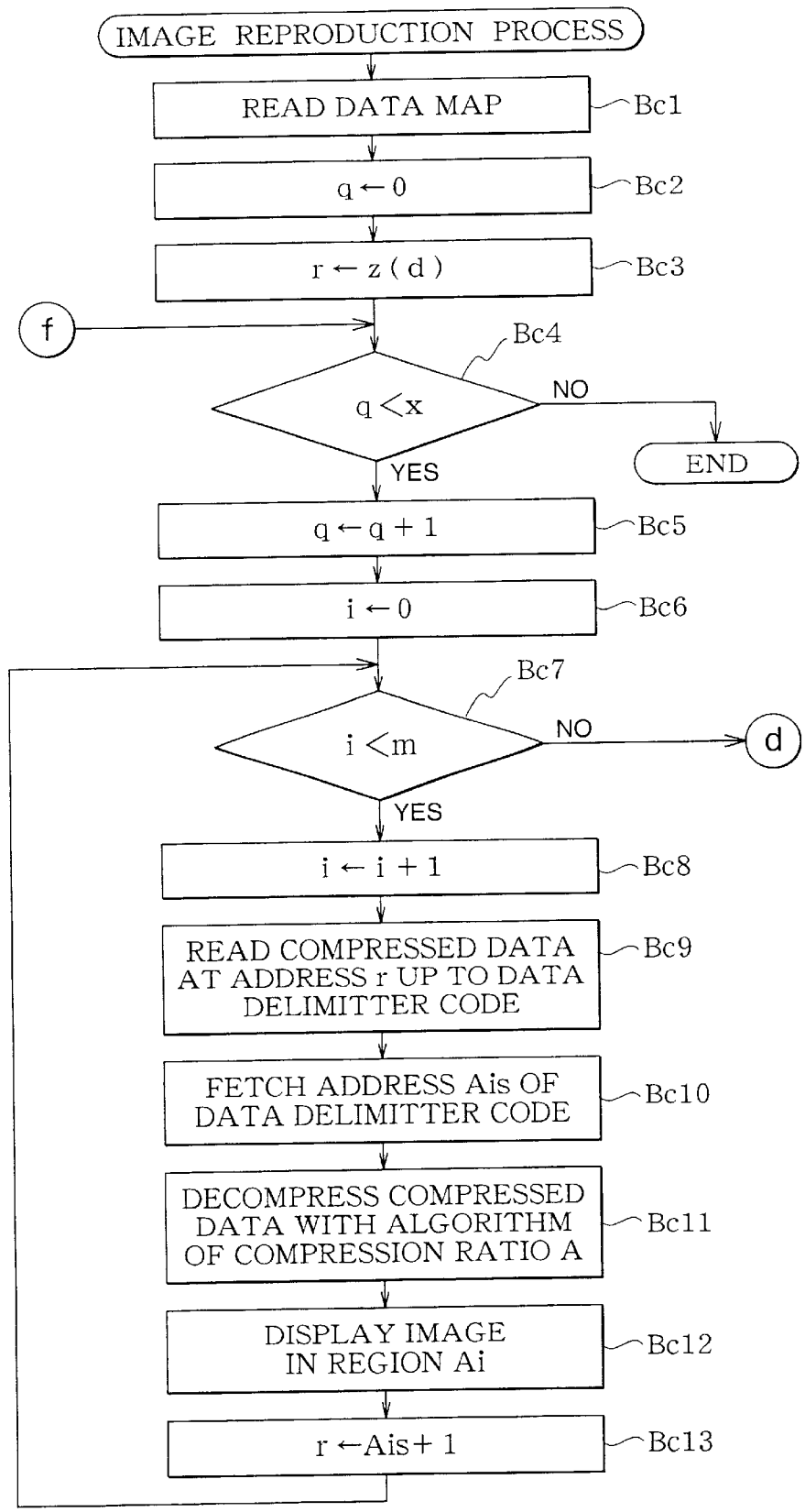
FIGS. 21, 22, and 23 are a flowchart showing an outline of the image reproduction process.
Figure 22:
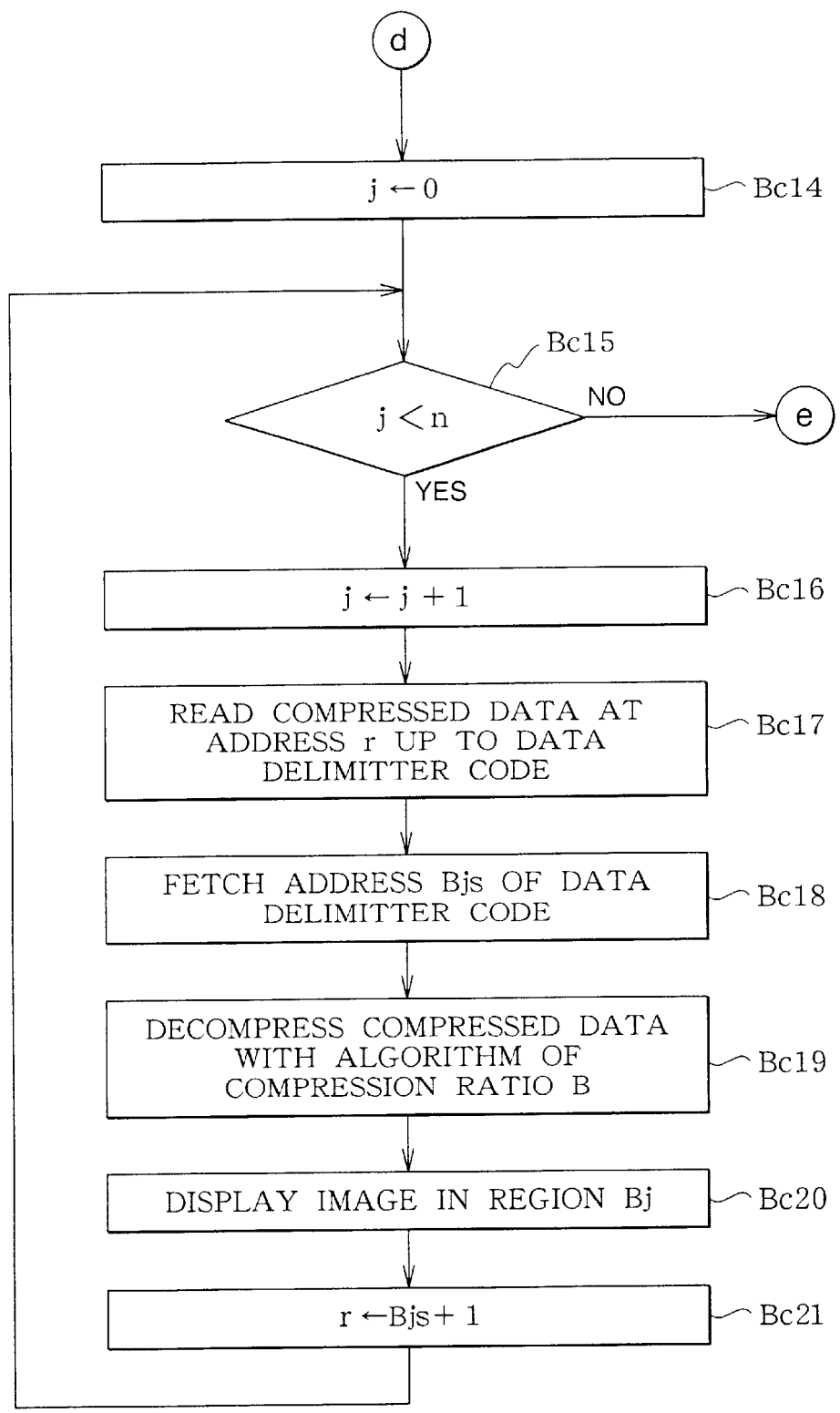
Figure 23:
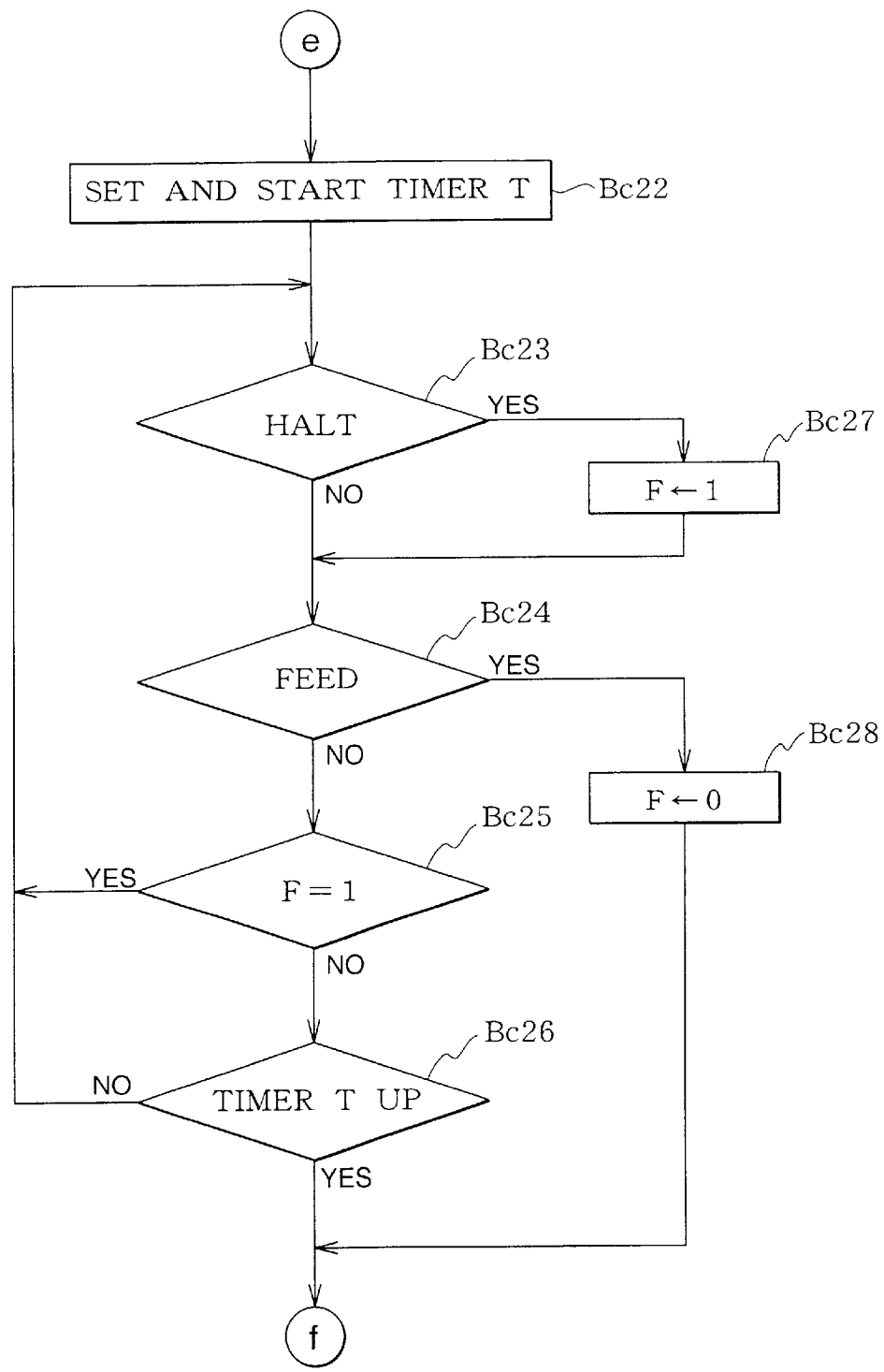

FIG. 21 to FIG. 23 are a flowchart showing an outline of the image reproduction process performed utilizing the compressed data decompression function and the image reproduction function of the image reconstruction block B16, i.e., the PC CPU provided in the external processing apparatus B14 such as a lap-top computer. The image decompression and reproduction are performed with this external processing apparatus B14 connected via the interface B13 to the main controller B8 of the drive recorder B2 by the operator operating the external processing apparatus B14.

It should be noted that in the explanation below, it is assumed that the collision experiment to be processed has been already selected among a plurality of collision experiments.

The PC CPU which has started an image reproduction process, firstly, reads from the compression condition storage block of the data storage medium of the drive recorder B2 the contents of the image compression condition as shown in FIG. 15($a$) and FIG. 15($b$), i.e., the compression ratio of region A and B, the position data of the respective small rectangular areas constituting the regions A and B, the total numbers m and n of the small rectangular areas constituting the regions A and B, respectively, and the number x of the images taken in, and temporarily stores these data in the RAM (step c1).

Next, the PC CPU initializes to 0 the value of the counter q for counting the number of images reproduced (step c2) and loads the value of the start address storage register z (d) corresponding to the d-th collision experiment to be reproduced, in the pointer indicating the compressed data read start position in the compressed data storage region of the data storage medium (step c3). That is, the compressed data storage region of the data storage medium contains 'y' sets of compressed data, each consisting of x images of compressed data as shown in FIG. 14, and the value of the pointer r is initializes to z (d) according to the head of the d-th set of the compressed data corresponding to the d-th (d≦y) collision experiment to be reproduced.

Figure 14:
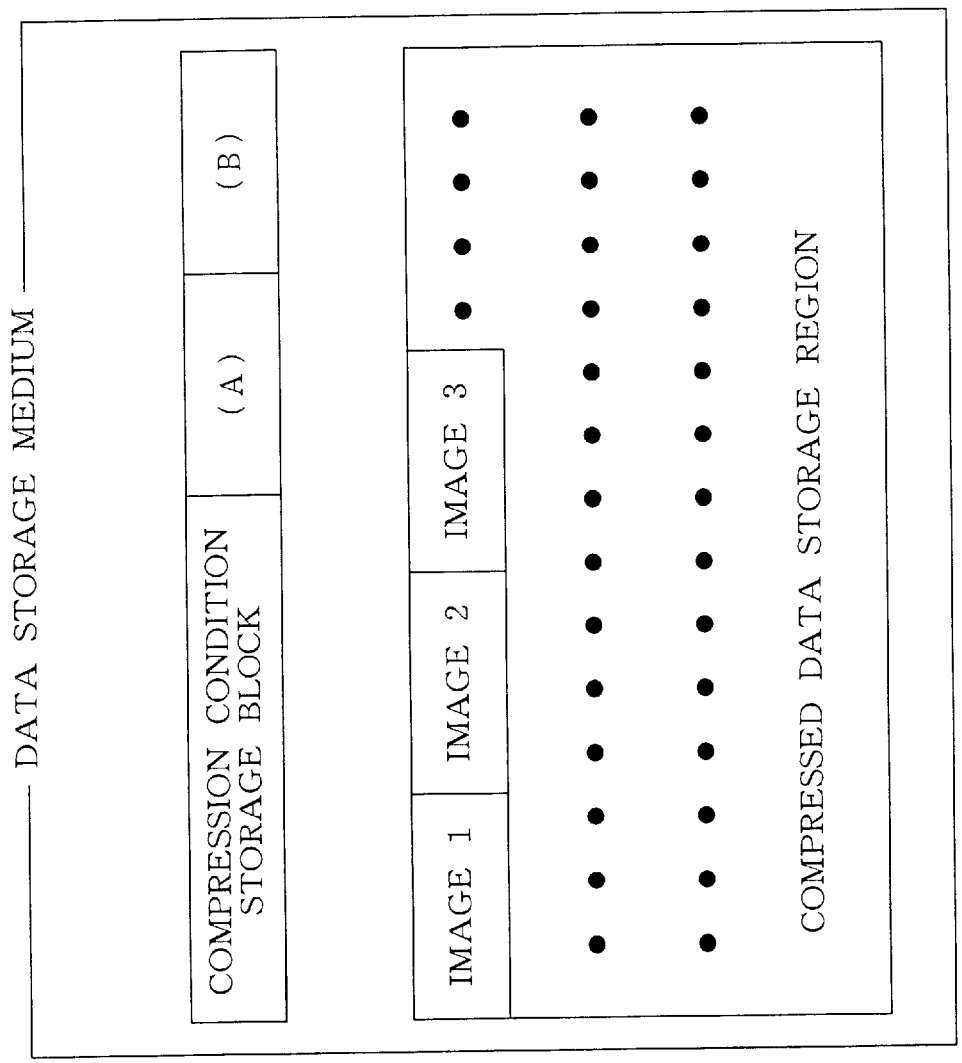
FIG. 14 is a conceptual view of a data storage medium.

Then, the PC CPU determines whether the current value of the counter q counting the number of images produced is smaller than the number x of images to be taken in, i.e., whether the set of data of the compressed data storage region of the data storage medium as shown in FIG. 14 still contains an image compressed data to be decompressed (step c4).

If the current value of the counter q counting the number of images reproduced is smaller than the number x of the images taken in, i.e., if the compressed data storage region containing the d-th set (collision experiment) of data still contains an image compressed data to be decompressed, the PC CPU increments by one the value of the counter q counting the number of images reproduced (step c5), and starts a process associated with decompression and reproduction of the q-th image taken in the aforementioned d-th image compression process.

Firstly, the PC CPU initializes to 0 the value of the counter i counting the number of small rectangular areas constituting the region A of a higher importance (step c6) and determines whether the current value of the counter i is smaller than the total number m of the small rectangular areas constituting the region A, i.e., whether the region A of the q-th image of the d-th image compression process still contains an image data of a small rectangular area to be extracted and decompressed (step c7).

If the value of the counter i is smaller than the total number m of the small rectangular areas, i.e., if the region A of the q-th image of the d-th image compression process still contains an image data of a small rectangular area to be decompressed, then the PC CPU increments by one the value of the counter i (step c8), reads in via the interface B13 a compressed data of address r up to the next data delimiter code, i.e., one small rectangular area in the compressed data storage region of the drive recorder B2 (step c9), and fetches the address Ais of the final read in end position in the compressed data storage region (step c10).

Next, the PC CPU decompresses the compressed data (which has been read in by the process of step c9) according to a decompression algorithm corresponding to the compression ratio A (step c11). Referencing a compression condition as shown in FIG. 15($a$) and according to the position data of the small rectangular area Ai corresponding to the current value of the counter i, the PC CPU relocates and displays the image of the small rectangular area which ahs been decompressed by the process of step c11, in the rectangular area defined by the start point (Aasi, Yasi) and the end point (Xaei, Yaei) (step c12). The PC CPU increments by one the value of the address Ais of the final read-in end position in the compressed data storage region so that the updated value is stored in the pointer r (step c13) as the read-in start position of the next compressed data.

Accordingly, for example, in the process of step c9, in the compressed data storage region, the image compressed data stored at address z (d) up to the first data delimiter code is read in. That is, among the q-th image compressed data in the aforementioned d-th image compression process, the image compressed data of the i-th=1st small rectangular area which has been the first to be extracted and compressed is read in. This image compressed data is decompressed according to the decompression algorithm of the compression ratio A in the process of step c11 and then by the display process of step c12, the decompressed image is relocated and displayed in the small rectangular area Ai corresponding to the current value of the counter i=1, i.e., in the rectangular area defined by the start point (Xasi, Yasi) and the end point (Xael, Yael) according to the position data of the small rectangular area Al.

Until the decision result of step c7 becomes false, the PC CPU repeats the aforementioned process while incrementing the value of the counter i. According to the current value of the counter i, among the compressed data of one image, the image obtained from the compressed data of the second rectangular area is displayed in a rectangular area defined by (Xas2, Yas2) and (Xae3, Yae2). Moreover, the image obtained from the compressed data of the third rectangular area is displayed in a rectangular area defined by (Xas3, Yas3) and (Xae3, Yae3). Thus, the display process is repeated.

When the decision result of step c7 becomes false and it is confirmed that all the compressed data of the small rectangular areas constituting the region A of the q-th image of the d-th image compression process have been read out from the compressed data region, decompressed, and displayed, the PC CPU starts the process for successively reading out from the compressed data region compressed data of the small rectangular areas constituting the region B of the same image and decompress so that the they are decompressed and displayed.

The processes associated with the reading out, decompression, and display of the small rectangular areas constituting the region B (steps c14 to c21) are performed substantially in the same way as the processes of steps c6 to c13, i.e., the processes performed for reproducing the small rectangular areas constituting the region A, by referencing the start/end position data (Xbsj, Ybsj) and (Xbej, Ybej) and the compression ratio B of the compression conditions as shown in FIG. 15(b). Accordingly, detailed explanation will be omitted.

Lastly, when the decision result of step c15 becomes false and it is confirmed that all the data of the small rectangular areas constituting the region B of the q-th image of the d-th image compression process have been read in from the compressed data storage region, and decompressed and displayed, the PC CPU terminates the process associated with the decompression and display of the image data stored in the compressed data storage region, sets a predetermined value in the timer T regulating an image display time and starts the timer T (step c22). After this, the PC CPU checks whether a halt key of the external processing apparatus B14 has been operated by the operator (step c23), whether a feed key of the external processing apparatus B14 has been operated by the operator (step c24), and whether the halt flag F has been set (step c25).

Since the halt flag F is not set at the initial stage, the PC CPU further checks whether the predetermined time of the timer T has elapsed (step c26). Unless the predetermined time of the timer T has elapsed, the decision processes of steps c23 to c26 are repeated.

When the halt key is depressed by the operator while the aforementioned processes are repeated, the halt flag F is set (step c27) and the decision result of step c25 becomes true. Accordingly, the decision processes of only the steps c23 to c25 are repeated. Until the feed key of the external processing apparatus B14 is depressed, the q-th image of the d-th image compression process displayed at this moment continues to be displayed as a still image on the monitor of the external processing apparatus B14.

In order to stop the still display of the image and to start a process of decompression and display associated with the q+1-th image, the operator operates the feed key of the external processing apparatus B14 and resets the halt flag F (step c28) so as to start the process of decompression and display of the one-shot image of the q+1-th take-in of the d-th image compression process.

Moreover, unless the halt key of the external processing apparatus B14 is operated, decision processes of steps c23 to c26 are repeatedly executed and when the value of the timer T reaches the predetermined time and the decision result of step c26 becomes true, the next process is automatically started. That is, a process of decompression and display associated with the one-shot image of the q+1-th take-in of the d-th image compression process is started.

Until the value of the counter q counting the number of images reproduced reaches the number x of the images taken in, the PC CPU repeats the aforementioned process while incrementing the value q so that the compressed images are decompressed and displayed one after another. Lastly, when the value of the counter q reaches the number x of the images taken in, i.e., when decompression and display of all the decompressed images obtained in the d-th image compression process are complete, the PC CPU completes all the processes associated with the image decompression and display.

The time set in the timer T is generally matched with the image take-in cycle of the CCD camera body B7, and it is preferable that images be switched from one to another under the same conditions as when filmed so as to be displayed as a moving picture. Accordingly, when a time that cannot be ignored is required for reading in and decompression of a compressed data, the image take-in cycle of the CCD camera body B7 subtracted by the time required for compression data read-in and decompression is set as the predetermined value in the timer T.

Moreover, by changing the predetermined value of the T, it is possible to perform a fast feed and slow motion display. As has been described above, it is also possible to perform a stop motion display by the operation of the halt key so as to accurately analyze the image.

Explanation has been given on a case when an image is divided into three regions A, B, and C, so that the region C having unnecessary image data is discarded and the remaining region is divided into region A having a comparatively high importance and region B having a comparatively low importance. However, it is also possible and easy to design to divide the region not discarded into more than two regions such as region A having the highest importance, region B having the intermediate importance, and region C having the lowest importance.

Moreover, the aforementioned configuration can be applied as it is when processing each of the images as a still image.

Description will now be directed effects of the present invention.

The vehicle driving information storage apparatus according to the present invention uses a single side angle lens for simultaneously filming the driver state and the state inside and outside the vehicle and can easily obtain synchronization between an image where the driver is filmed and an image where the state outside the vehicle is filmed, which has been difficult to realize by the conventional apparatus using a plurality of cameras.

Moreover, since the vehicle driving information storage apparatus needs only one camera, the cost is significantly reduced and the space occupied by the apparatus is also reduced to improve the condition inside the vehicle. Moreover, the weight of the apparatus is minimized and almost does not affect the acceleration characteristic and the brake characteristic of the vehicle.

Furthermore, the first and the second latest image storage unit having different image update cycles are arranged in parallel for preserving images and accordingly, it is possible to accurately know the driver's state and the state inside and outside the vehicle immediately before and after the moment when a driving condition sudden change has occurred as well as to roughly grasp the driver's state and the state inside and outside the vehicle for a comparatively long period of time before and after the driving condition sudden change, which requires a comparatively small storage capacity of the storage medium required for image recording.

Moreover, a convex mirror is arranged within the field angle of the wide angle lens so that an image in a dead area of the wide angle lens is filmed via this convex mirror.

Accordingly, in spite of filming using only a single wide angle lens, substantially it is possible to cover a sufficient filming range.

Furthermore, the driver's state and the vehicle state detected by a unit other than the filming are stored in synchronization with the image take-in cycle, it is possible to perform analysis of an objective condition based not only on the image.

By using an acceleration sensor as the state change detection unit, it is possible to detect an occurrence of a sudden brake or collision and to record a condition change before and after the sudden brake or collision. Accordingly, it is possible to analyze a traffic accident and a vehicle collision experiment. Moreover, since the apparatus has a power backup unit required for maintaining the function of the apparatus, even if the vehicle is damaged by a traffic accident or a vehicle collision experiment, it is possible to film and maintain a condition immediately after the collision with a high possibility.

Moreover, according to another aspect of the present invention, an image is divided into a plurality of regions having different compression ratios set according to the importance degree, i.e., a region of a lower importance has a higher compression ratio and a compression is performed for each of the regions. Accordingly, it is possible to increase the image compression ratio as a whole while maintaining the image quality of the region of the higher importance and to preserve an image data in a small storage capacity.

Moreover, the compressed image of the respective regions are preserved together with a position information in a data storage medium. Accordingly, when reproducing the data, the compressed data of the respective regions preserved in the data storage medium are decompressed separately from one another and relocated according to the position information of the respective regions so as to reproduce the previous image. Furthermore, each of the regions can be specified separately at a plurality of positions.

Moreover, the image data of an unnecessary portion is discarded and will not be compressed and stored. Accordingly, it is possible to significantly save the file size of the compressed image without losing or deteriorating a necessary image information.

Moreover, when an image is divided into regions of complicated shapes, each of the region is divided into small rectangular areas, each of which is processed in data compression and decompression. Accordingly, without developing a new image compression method, it is possible to utilize an existing data compression method such as the JEPG and other sequential coding compression algorithm so as to realize an image compression with a high compression efficiency.

Moreover, an image can be divided into a plurality of types of regions whose size and shape can be changed if necessary and the compression ratio can be set for each of the types. Thus, the image processing apparatus can be used for various filming objects.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-18146 (Filed on Jan. 27$^{th}$, 1999) and Japanese Patent Application No. 11-221176 (Filed on Aug. 4$^{th}$, 1999) including specification, claims, drawings and summary are incorporated herein by reference in its entirety.

What is claimed is:

1. A vehicle driving information storage apparatus that stores an image of a driver's state and a vehicle state, said apparatus comprising:

a wide angle lens configured and positioned to simultaneously capture a driver's state, a state inside a vehicle, and a state outside a vehicle;

a signal output that outputs a digital signal of an image captured by said wide angle lens;

an image storage that stores and is updated with the digital signals output from said signal output at a predetermined frequency;

a condition change detector that detects a change of a driving condition of the vehicle;

a necessary image data preserver that inhibits an update of the digital signals after detection of the change by said condition change detector;

a latest image storage that stores a plurality images from the digital signals output from said signal output and updates with the digital signals output from said signal output on a first-in, first-out (FIFO) basis at a predetermined frequency; and a necessary image data preserver that allows an update of images on FIFO basis a predetermined number of times after detection of a driving condition change by said condition change detector and inhibiting update of images thereafter.

2. The vehicle driving information storage apparatus according to claim 1, said apparatus further comprising a first and a second latest image storage that have different FIFO image update frequencies and that are arranged electrically in parallel to each other.

3. The vehicle driving information storage apparatus according to claim 1, wherein a convex mirror is arranged within a field of view of said wide angle lens so that an image that is outside a field of view of said wide angle lens is captured via said convex mirror.

4. The vehicle driving information storage apparatus according to claim 1, said apparatus further comprising a condition detector that detects a condition of one of a driver and a vehicle to be output as a digital data, which is stored in synchronization with the image update frequency.

5. The vehicle driving information storage apparatus according to claim 1, wherein said condition change detector is an acceleration sensor.

6. The vehicle driving information storage apparatus according to claim 1, wherein each of said image storage, said condition change detector, and said necessary image data preserver are provided with a power backup arranged independently of other functional components of the vehicle.

7. A vehicle driving information storage method for storing an image of a driver's state and a vehicle state, said method comprising:

simultaneously capturing an image of a driver's state, a state inside a vehicle, and a state outside a vehicle with a wide angle lens;

outputting a digital signal of an image captured by said wide angle lens from a signal output;

storing and updating an image storage with the digital signal output from said signal output at a predetermined frequency;

detecting a change of a driving condition of said vehicle by a condition change detector;

inhibiting an update of images by a necessary image data preserver after detection of a driving condition change by said condition change detector;

dividing the image into a necessary region and an unnecessary region according to an importance of image information in the image, so that the unnecessary region of the image is discarded and the necessary region is stored together with position information of the region in a data storage and dividing the remaining image into a plurality of regions according to the image information importance in the image;

setting different compression ratios for said regions such that a region of a lower importance has a higher compression ratio than a region of a higher importance; and generating compressed data for each of said regions and storing the compressed data in the data storage; and wherein when reproducing the image, separately decompressing the compressed data of the necessary region stored in the data storage and relocating the decompressed data according to the position information.

8. A vehicle driving information storage method for storing an image of a driver's state and a vehicle state, said method comprising:

simultaneously capturing an image of a driver's state, a state inside a vehicle, and a state outside a vehicle with a wide angle lens;

outputting a digital signal of an image captured by said wide angle lens from a signal output;

storing and updating an image storage with the digital signal output from said signal output at a predetermined frequency;

detecting a change of a driving condition of said vehicle by a condition change detector;

inhibiting an update of images by a necessary image data preserver after detection of a driving condition change by said condition change detector;

dividing the image into a necessary region and an unnecessary region according to an importance of the image information in the image and discarding the image of the unnecessary region;

dividing the necessary region into a plurality of regions according to the importance of the image information in the necessary region;

setting different compression ratios for the respective regions such that a region of a lower importance has a higher compression ratio than a region of a higher importance, and generating compressed data for each of the regions of the necessary region to be stored together with position information of the respective regions in a data storage; and reproducing the image by separately decompressing the compressed data of the respective regions of the necessary region and relocating the decompressed data according to the respective position information of the corresponding regions.

9. A vehicle driving information storage method for storing an image of a driver's state and a vehicle state, said method comprising:

simultaneously capturing an image of a driver's state, a state inside a vehicle, and a state outside a vehicle with a wide angle lens;

outputting a digital signal of an image captured by said wide angle lens from a signal output;

storing and updating an image storage with the digital signal output from said signal output at a predetermined frequency;

detecting a change of a driving condition of said vehicle by a condition change detector;

inhibiting an update of images by a necessary image data preserver after detection of a driving condition change by said condition change detector;

dividing the image into a plurality of types of regions according to the image information importance in the image;

setting different compression ratios for said types of regions in such a manner that a region of a lower importance has a higher compression ratio than a region of a higher importance; and generating compressed data for each of said regions and storing the compressed data in a data storage medium, wherein each of the regions is divided into small rectangular areas, so that a sequential coding is applied to the respective regions to generate a compressed data for each of the regions, the regions being stored in a data storage medium together with position information of the respective small rectangular areas as the position information of the respective regions.

10. The vehicle driving information storage apparatus according to claim 1, the apparatus further comprising:

a compression condition setter having a region setter that sets a plurality of types of image storage regions for a memory storing an image;

a compression ratio setter that sets a compression ratio of each of the image storage regions;

an image compressor having a compression condition storage that stores the image storage regions set in the compression condition setter, the position information, and the compression ratios;

a compressed data generator that generates compressed data for each of the image storage regions according to the type of image storage regions and compression ratios stored in the compression condition storage;

a data storage that stores the compressed data generated by the compression data generator; and an image reconstructor having a compressed data decompressor that separately decompresses the compressed data stored in the data storage according to the compression ratios stored in the compression condition storage for each of the image storage regions; and an image reproducer that relocates the decompressed data on an image reproduction memory according to the position information of the respective image storage regions stored in the compression condition storage and that reproduces the image.

11. The vehicle driving information storage apparatus according to claim 1, the apparatus further comprising:

an image compressor having a compression condition storage containing a plurality of image storage regions set for an image storage in the memory and their position information and compression ratios of the respective image storage regions; a compressed data generator that generates compressed data for each of the image storage regions according to the image storage regions and the compression ratios stored in the compression condition storage; and a data storage that stores the compressed data generated by the compressed data generator; and an image reconstructor having compressed data decompressor that separately decompresses the compressed data stored in the data storage according to the compression ratios stored in the compression condition storage for each of the image storage regions; and an image reproducer that relocates the decompressed data on an image reproduction memory according to the position information of the respective image storage regions stored in the compression condition storage and reproducing the image.

12. The vehicle driving information storage apparatus according to claim 1, wherein the wide angle lens is mounted on the back of a roof of the vehicle with an angled forward.

13. The vehicle driving information storage apparatus according to claim 1, wherein the wide angle lens is mounted on a dash board of the vehicle.

* * * * *